US012694643B2

(12) United States Patent
Ko

(10) Patent No.: US 12,694,643 B2
(45) Date of Patent: Jul. 28, 2026

(54) METHOD FOR RECONSTRUCTING 3D INFORMATION FROM 2D IMAGE AND METHOD AND APPARATUS FOR MEASURING DISTANCE BETWEEN VEHICLES USING THEREOF

(71) Applicant: THINKWARE CORPORATION, Seongnam-si (KR)

(72) Inventor: Suk Pil Ko, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 418 days.

(21) Appl. No.: 18/336,180

(22) Filed: Jun. 16, 2023

(65) Prior Publication Data

US 2024/0005632 A1     Jan. 4, 2024

(30) Foreign Application Priority Data

Jun. 16, 2022   (KR) ........................ 10-2022-0073631
Jun. 15, 2023   (KR) ........................ 10-2023-0077083

(51) Int. Cl.
| | |
|---|---|
| *G06V 10/74* | (2022.01) |
| *G06T 7/60* | (2017.01) |
| *G06T 7/80* | (2017.01) |
| *G06V 10/25* | (2022.01) |
| *G06V 20/56* | (2022.01) |

(52) U.S. Cl.
CPC .............. *G06V 10/761* (2022.01); *G06T 7/60* (2013.01); *G06T 7/80* (2017.01); *G06V 10/25* (2022.01); *G06V 20/56* (2022.01); *G06T 2207/20164* (2013.01)

(58) Field of Classification Search
CPC ...... G06V 10/761; G06V 10/25; G06V 20/56; G06V 10/764; G06V 10/82; G06V 2201/08; G06V 20/58; G06T 7/60; G06T 7/80; G06T 2207/20164; G06T 7/70; G06T 2207/10016; G06T 2207/20081; G06T 2207/20084; G06T 2207/30196; G06T 2207/30252; G06T 7/593; G06T 3/18; G06T 7/521; G06T 7/543; G06T 7/73; G06T 2210/12
See application file for complete search history.

(56) References Cited

PUBLICATIONS

Huang, Liqin ("Robust Inter-Vehicle Distance Estimation Method on Monocular Vision") IEEE Access, 2019. (Year: 2019).*

* cited by examiner

*Primary Examiner* — Molly Wilburn

(57) ABSTRACT

The method for measuring a distance between vehicles according to the present disclosure includes acquiring a 2D image obtained by capturing a non-ego vehicle using a camera mounted in an ego vehicle in driving, detecting a 2D bounding box which encloses the non-ego vehicle in the 2D image, detecting a 3D coordinate of at least one 3D vertex of a virtual 3D bounding box which encloses the non-ego vehicle in a 3D space, from a coordinate of a vertex of the 2D bounding box, using unprojection conversion from the 2D image to the 3D space, based on an intrinsic parameter of the camera and an extrinsic parameter with respect to the ego vehicle, and measuring a distance between the ego vehicle and the non-ego vehicle using the 3D coordinate of the at least one 3D vertex.

14 Claims, 23 Drawing Sheets

10

IMAGE ACQUIRING UNIT (11)

BOUNDING BOX DETECTING UNIT (12)

3D INFORMATION RECONSTRUCTING UNIT(13)

DISTANCE MEASURING UNIT (14)

Figure 1:
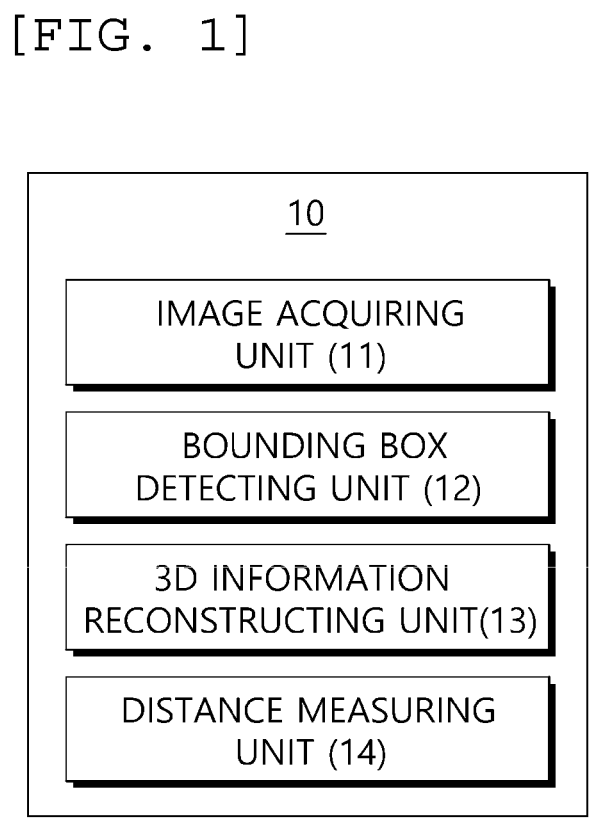

IMAGE ACQUIRING
UNIT (11)

BOUNDING BOX
DETECTING UNIT (12)

3D INFORMATION
RECONSTRUCTING UNIT(13)

DISTANCE MEASURING
UNIT (14)

[FIG. 2]
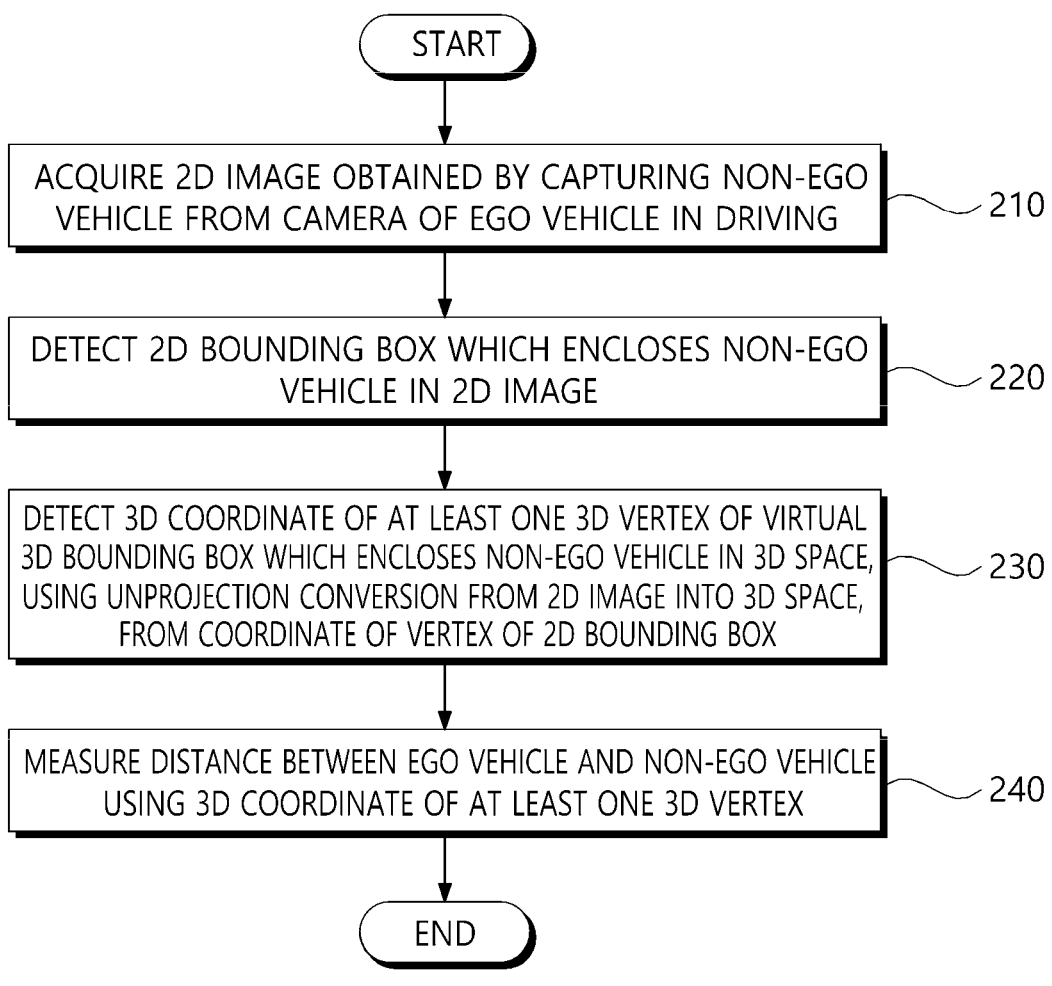

[FIG. 3]
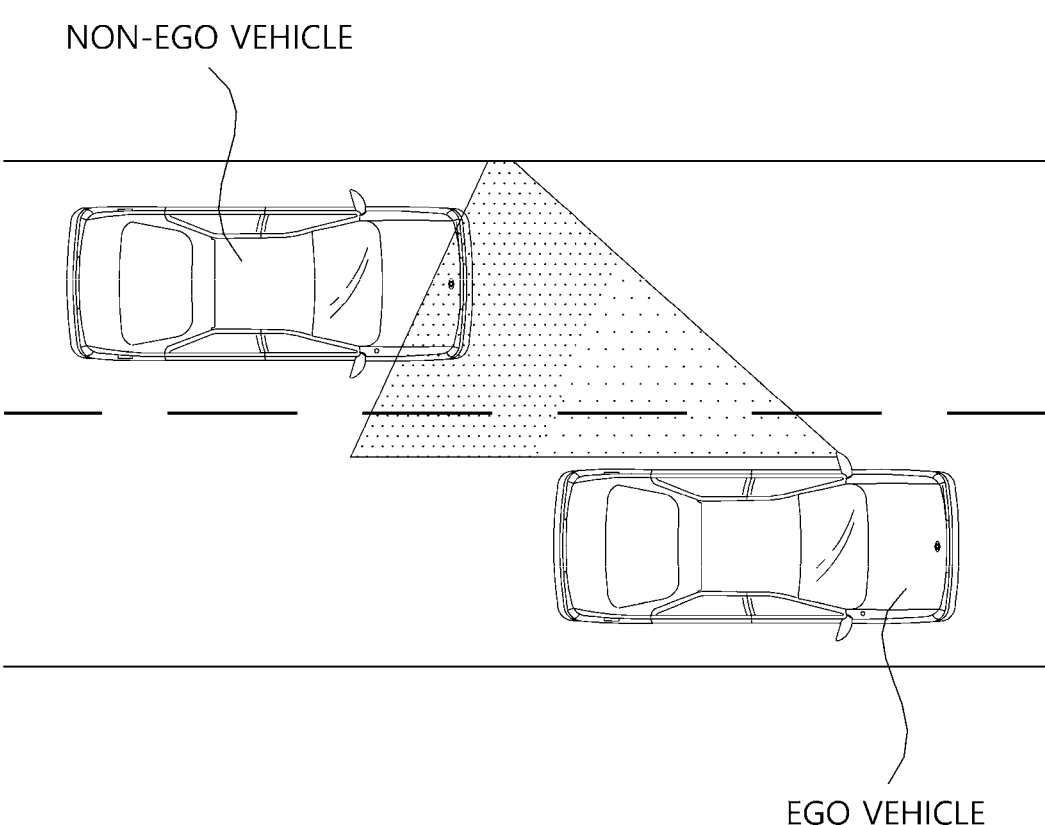
NON-EGO VEHICLE
EGO VEHICLE

[FIG. 4]
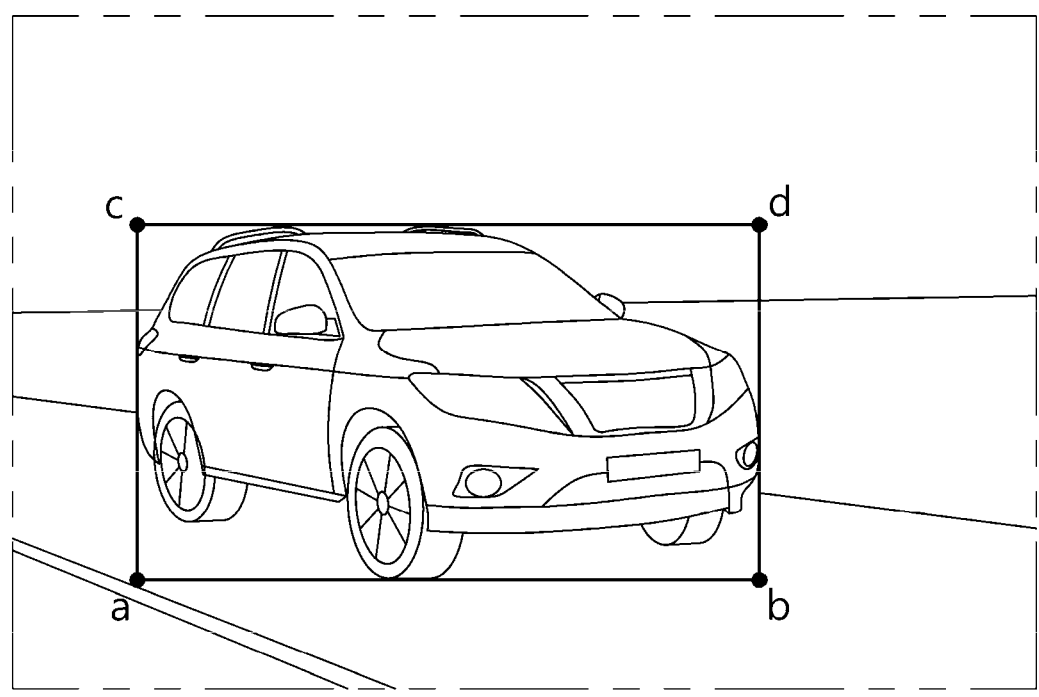
[FIG. 5]
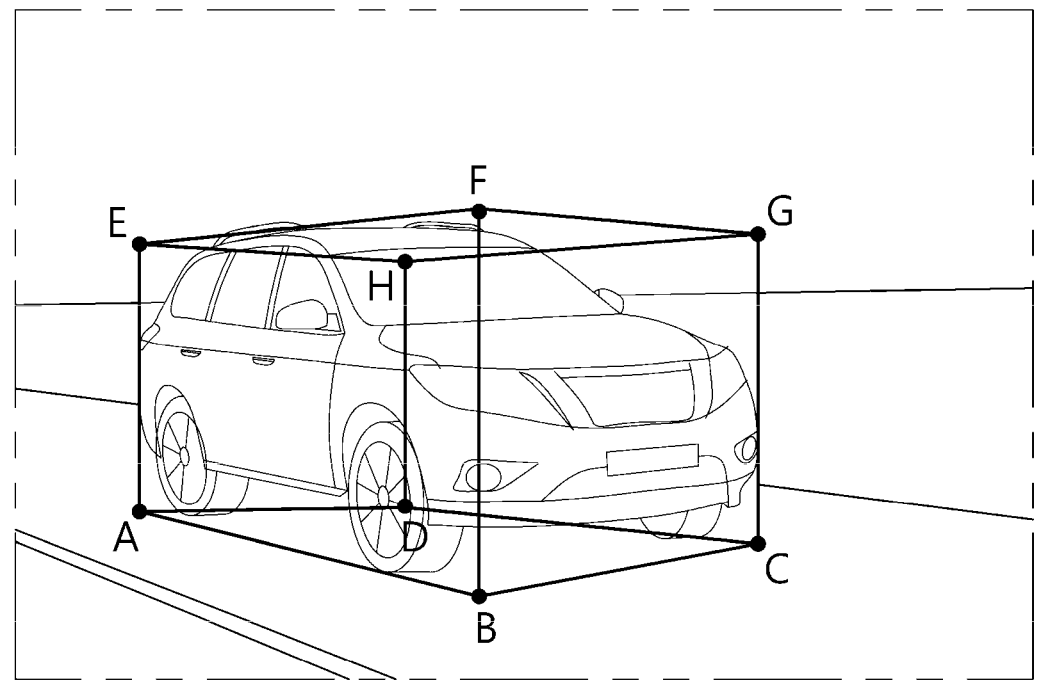

[FIG. 6]
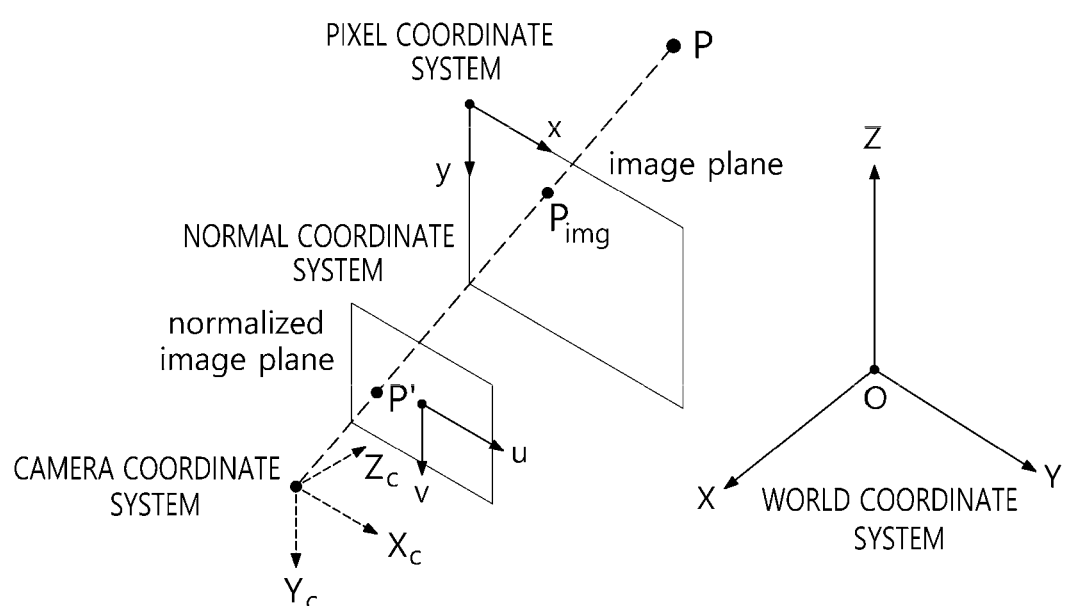

[FIG. 7]
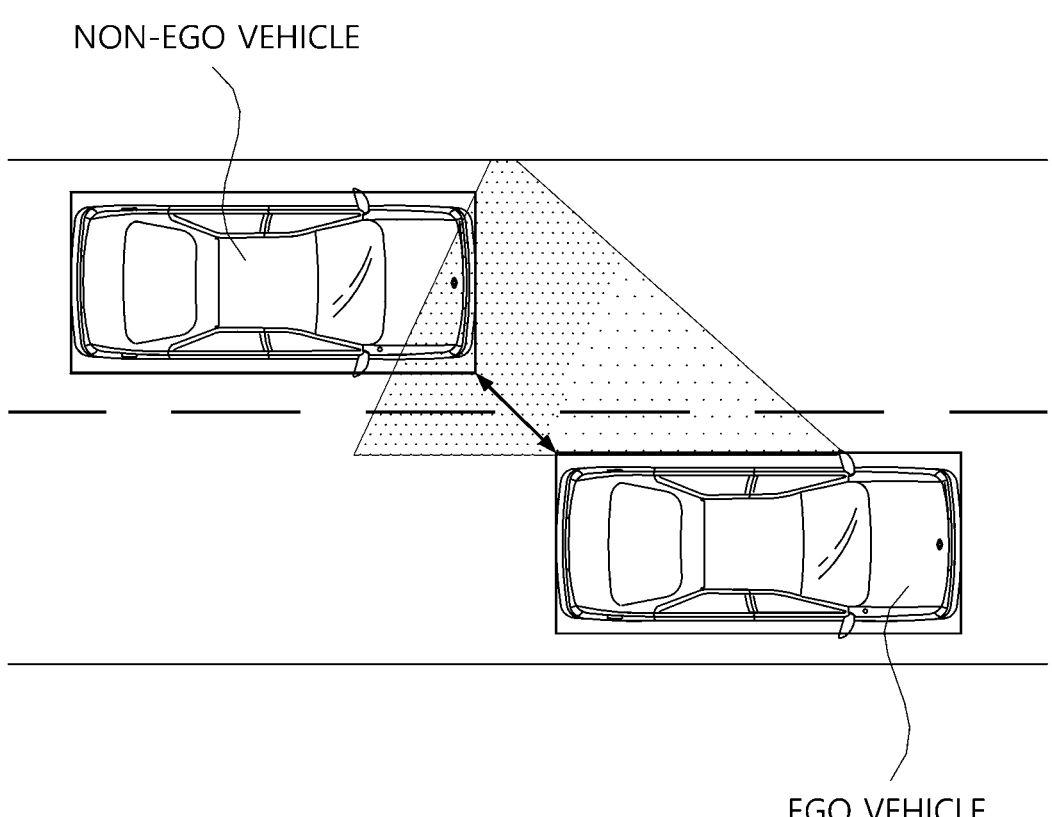

[FIG. 8]
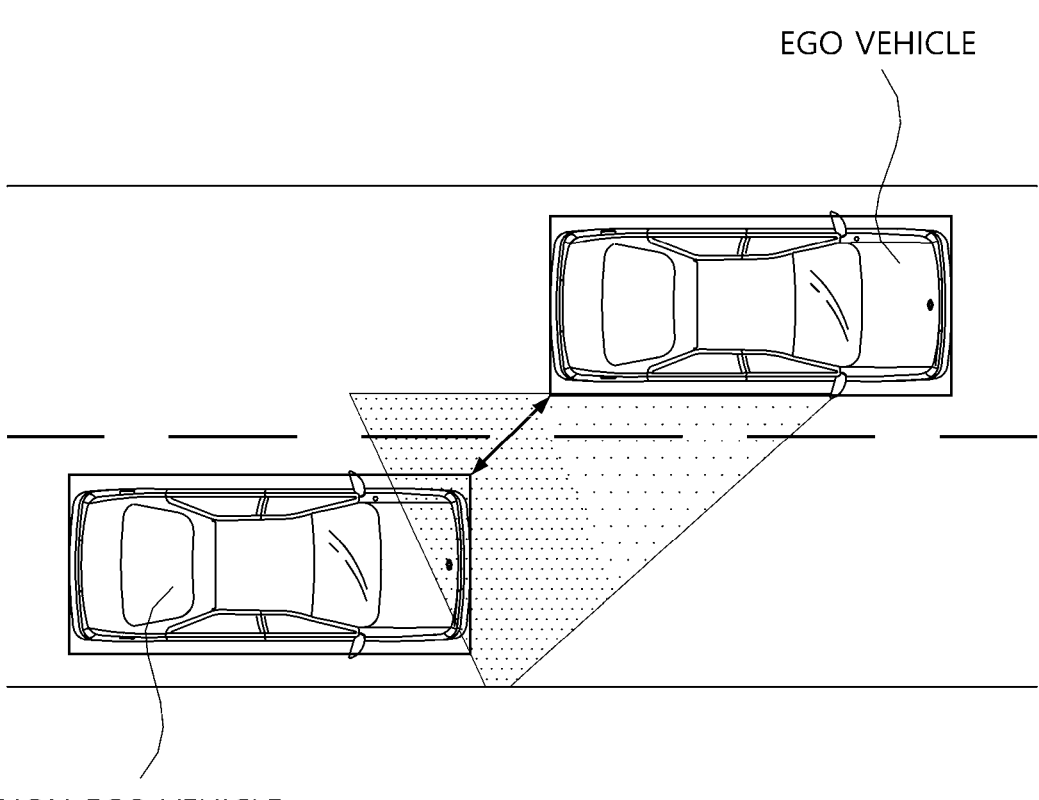
EGO VEHICLE
NON-EGO VEHICLE

[FIG. 9]
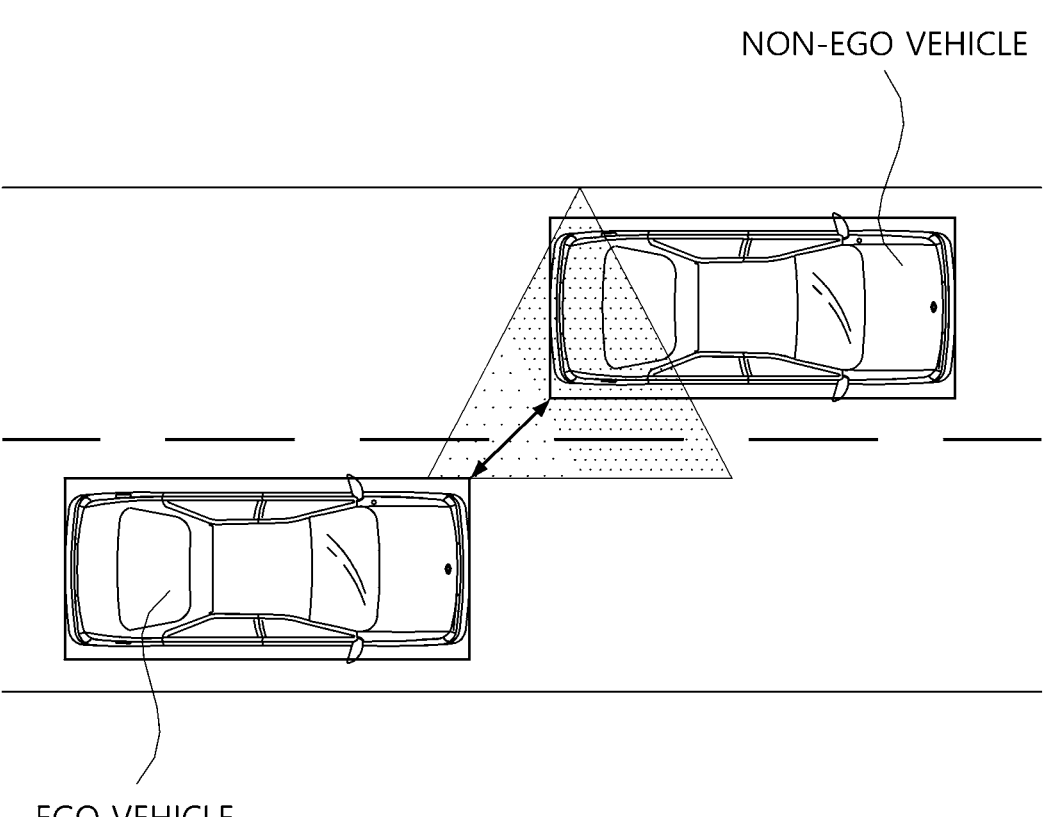
NON-EGO VEHICLE
EGO VEHICLE

[FIG. 10]
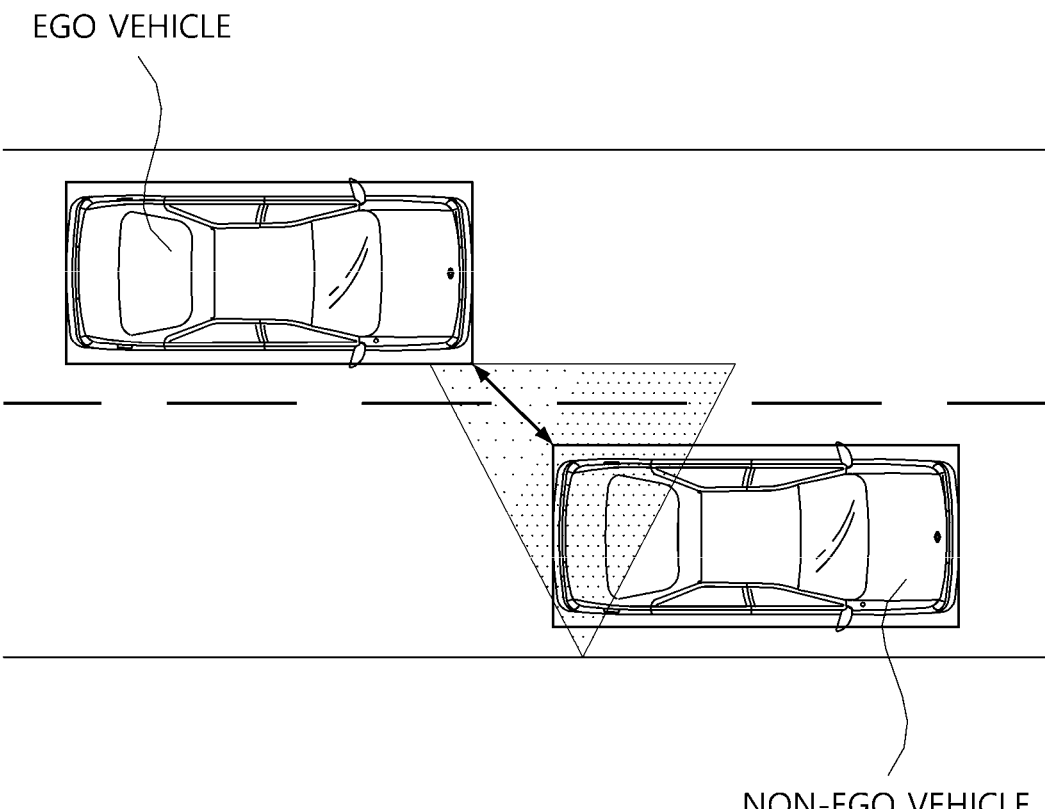

[FIG. 11]

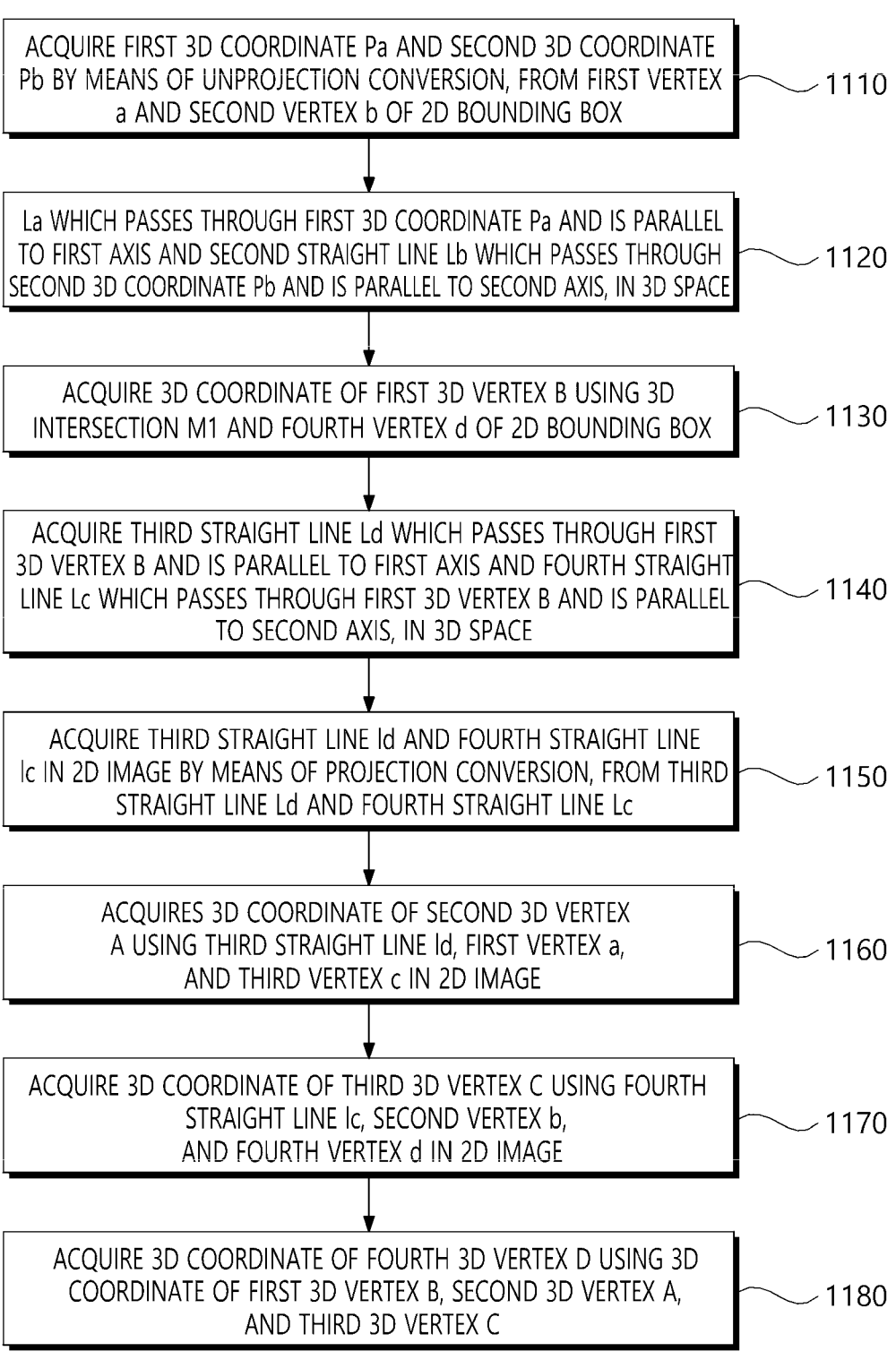

ACQUIRE FIRST 3D COORDINATE Pa AND SECOND 3D COORDINATE Pb BY MEANS OF UNPROJECTION CONVERSION, FROM FIRST VERTEX a AND SECOND VERTEX b OF 2D BOUNDING BOX    ～1110

La WHICH PASSES THROUGH FIRST 3D COORDINATE Pa AND IS PARALLEL TO FIRST AXIS AND SECOND STRAIGHT LINE Lb WHICH PASSES THROUGH SECOND 3D COORDINATE Pb AND IS PARALLEL TO SECOND AXIS, IN 3D SPACE    ～1120

ACQUIRE 3D COORDINATE OF FIRST 3D VERTEX B USING 3D INTERSECTION M1 AND FOURTH VERTEX d OF 2D BOUNDING BOX    ～1130

ACQUIRE THIRD STRAIGHT LINE Ld WHICH PASSES THROUGH FIRST 3D VERTEX B AND IS PARALLEL TO FIRST AXIS AND FOURTH STRAIGHT LINE Lc WHICH PASSES THROUGH FIRST 3D VERTEX B AND IS PARALLEL TO SECOND AXIS, IN 3D SPACE    ～1140

ACQUIRE THIRD STRAIGHT LINE ld AND FOURTH STRAIGHT LINE lc IN 2D IMAGE BY MEANS OF PROJECTION CONVERSION, FROM THIRD STRAIGHT LINE Ld AND FOURTH STRAIGHT LINE Lc    ～1150

ACQUIRES 3D COORDINATE OF SECOND 3D VERTEX A USING THIRD STRAIGHT LINE ld, FIRST VERTEX a, AND THIRD VERTEX c IN 2D IMAGE    ～1160

ACQUIRE 3D COORDINATE OF THIRD 3D VERTEX C USING FOURTH STRAIGHT LINE lc, SECOND VERTEX b, AND FOURTH VERTEX d IN 2D IMAGE    ～1170

ACQUIRE 3D COORDINATE OF FOURTH 3D VERTEX D USING 3D COORDINATE OF FIRST 3D VERTEX B, SECOND 3D VERTEX A, AND THIRD 3D VERTEX C    ～1180

[FIG. 12]
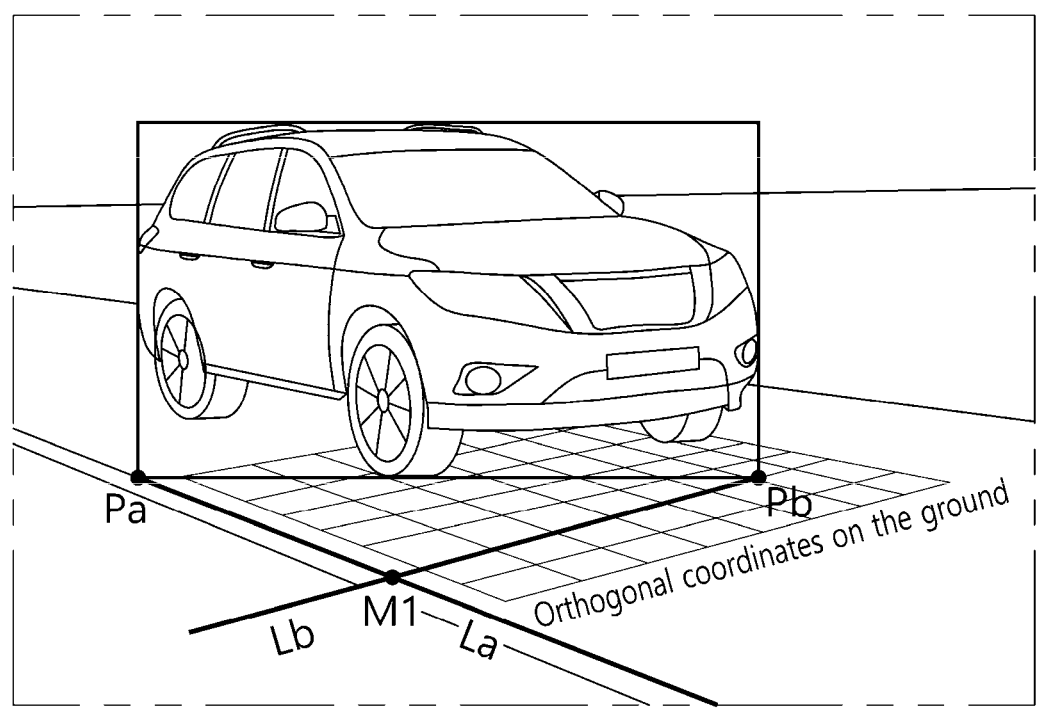
[FIG. 13]
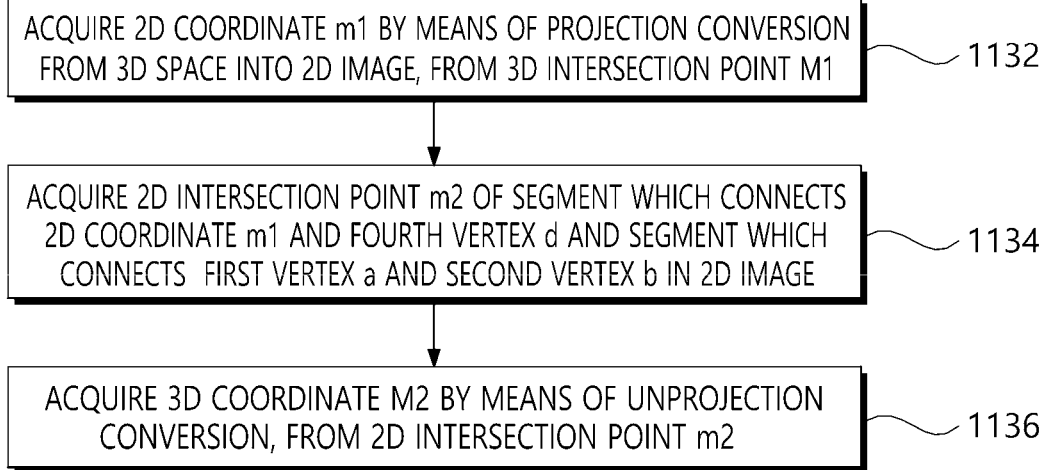

[FIG. 14]
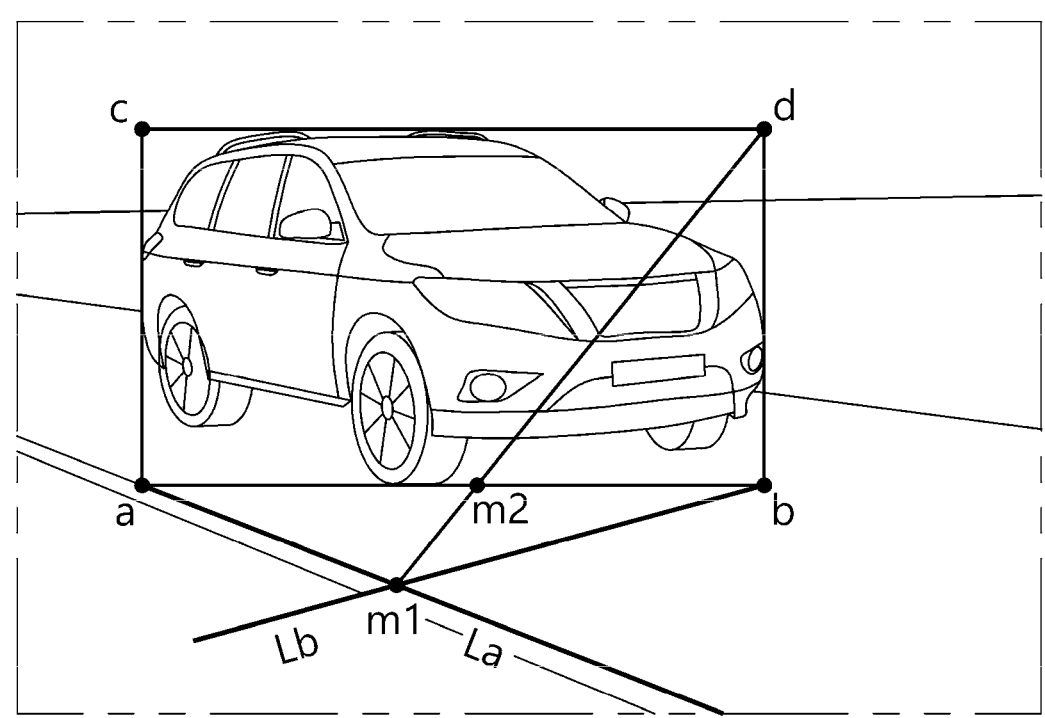

[FIG. 15]
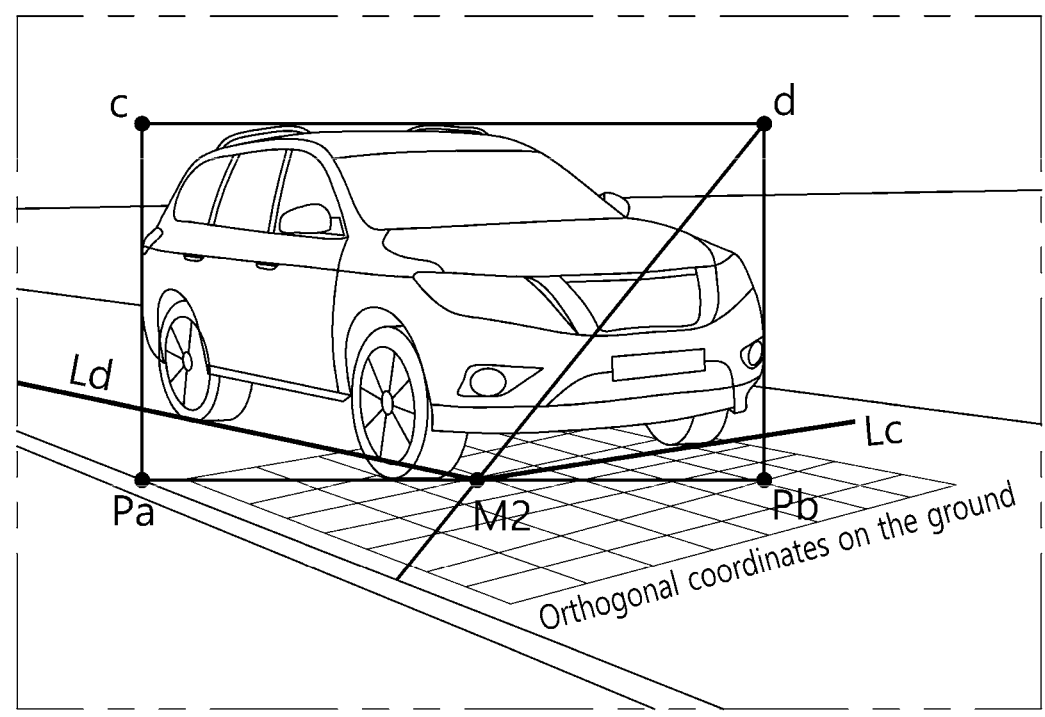

[FIG. 16]
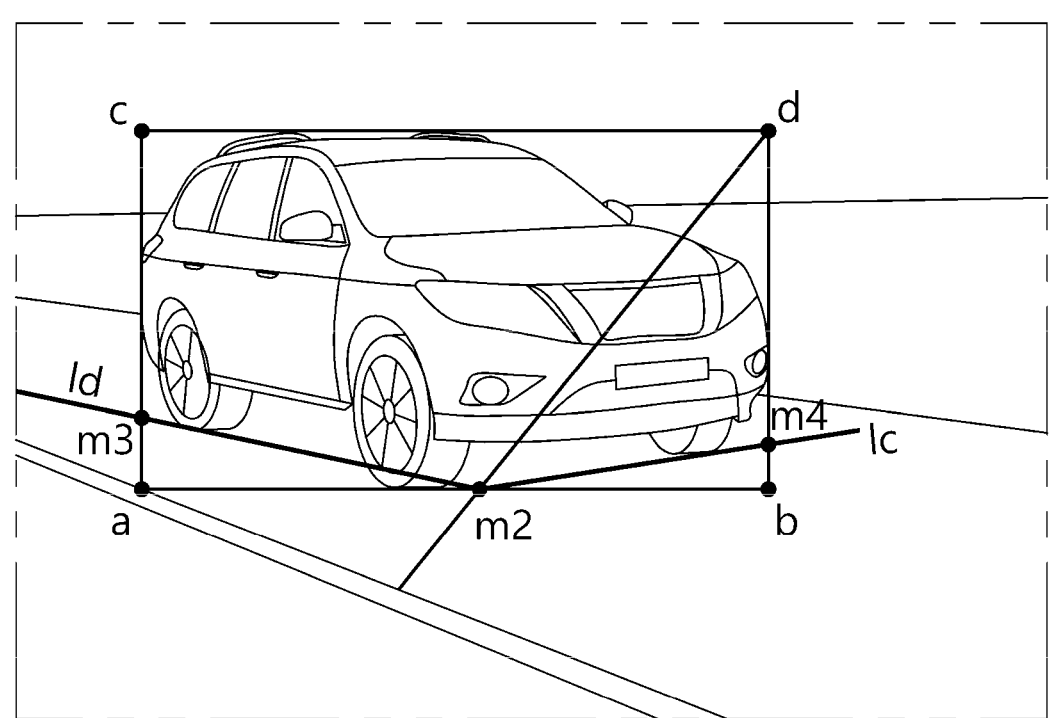

[FIG. 17]
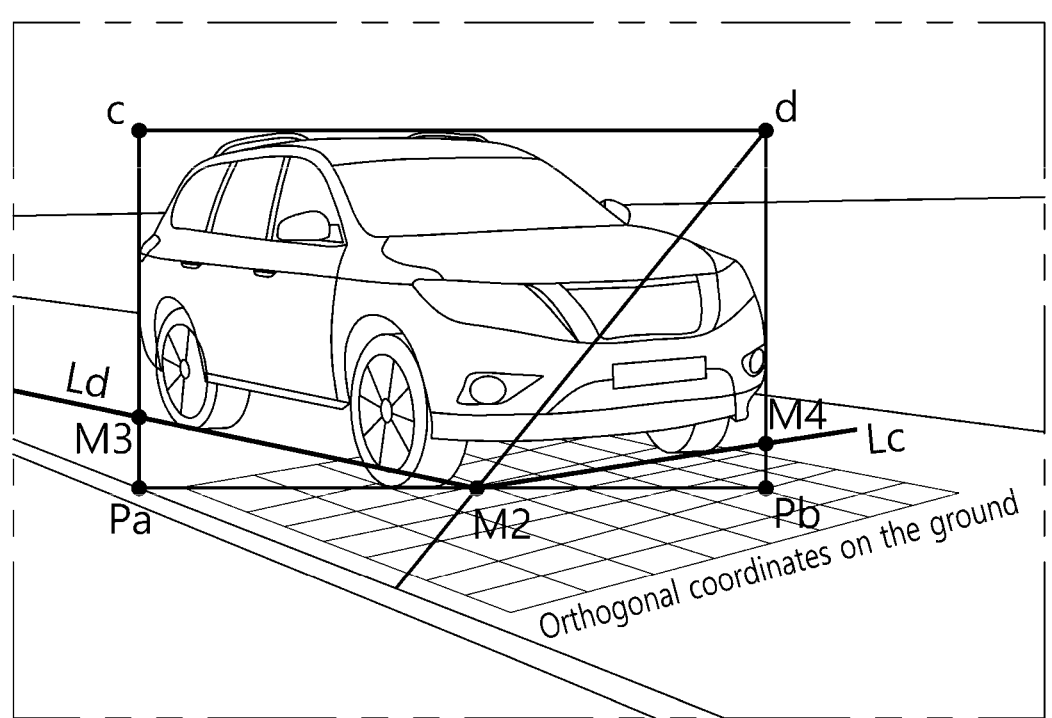

[FIG. 18]
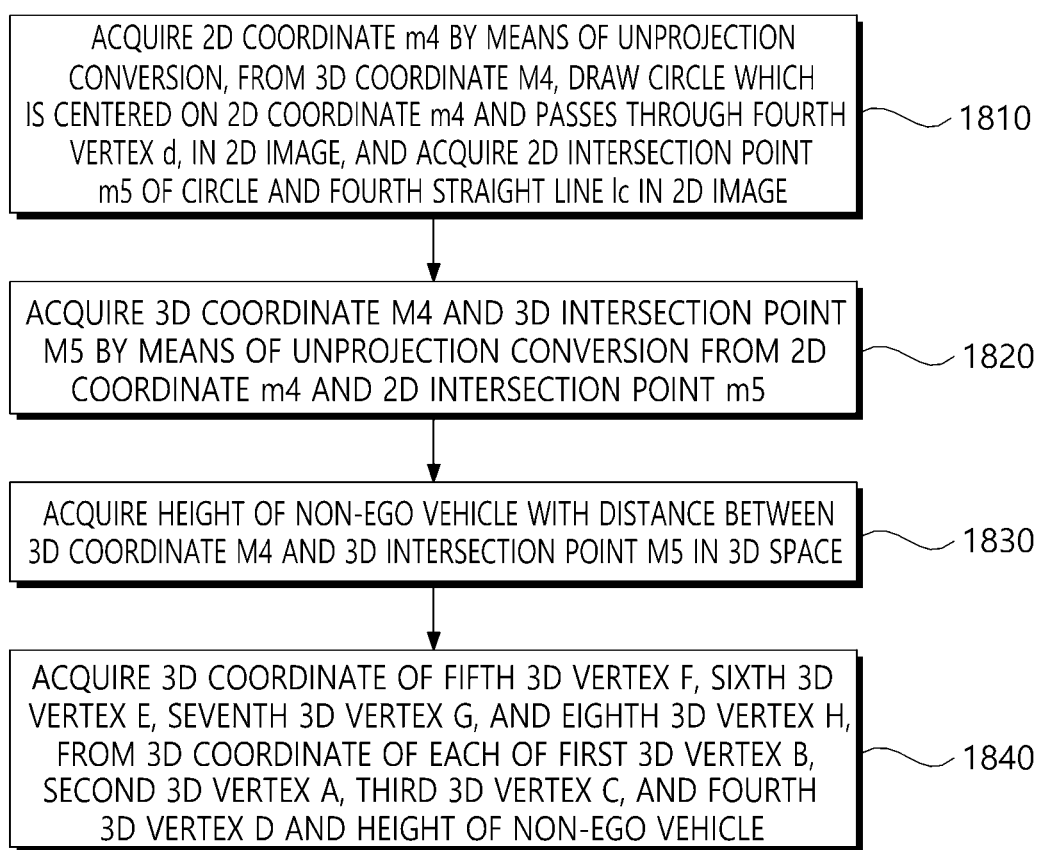

[FIG. 19]
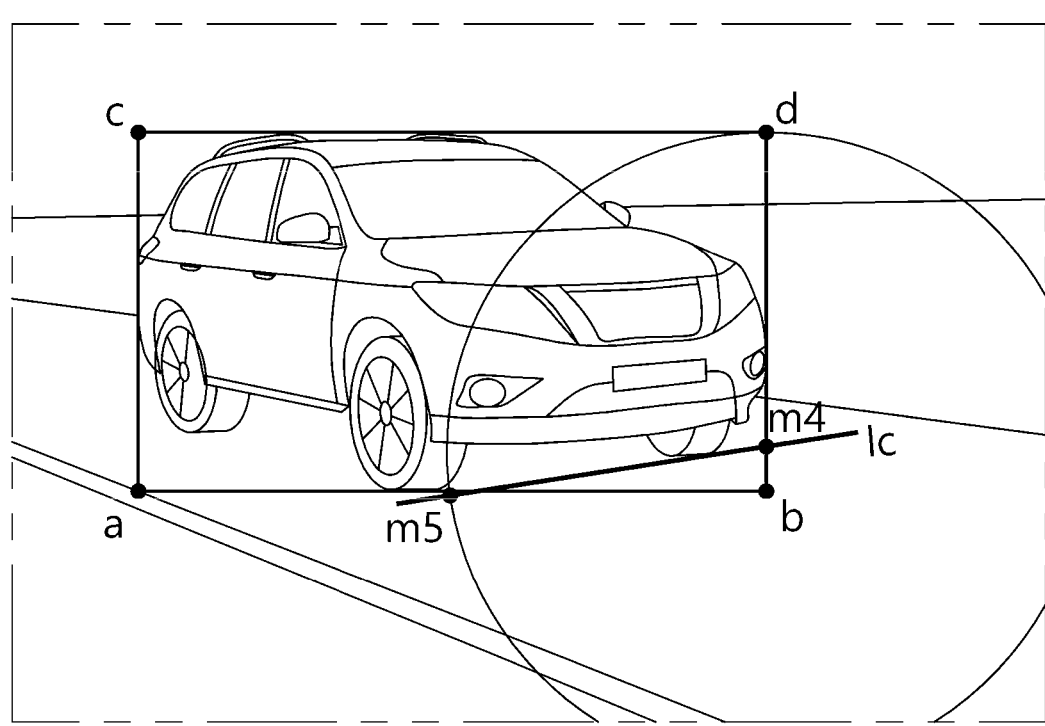

[FIG. 20]
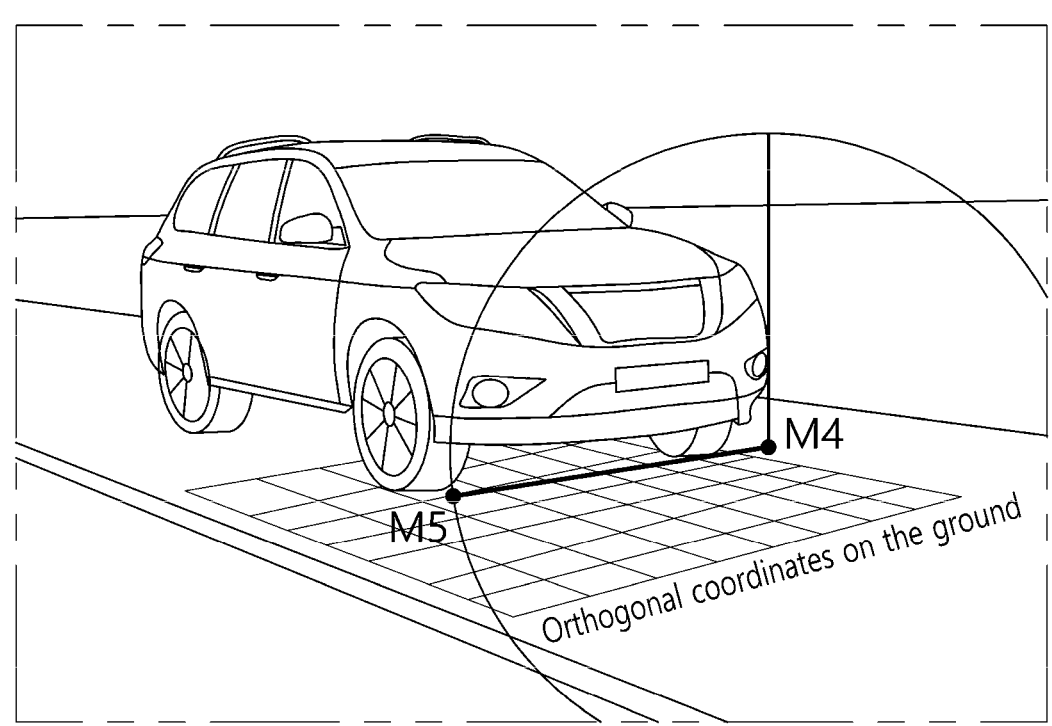

[FIG. 21]
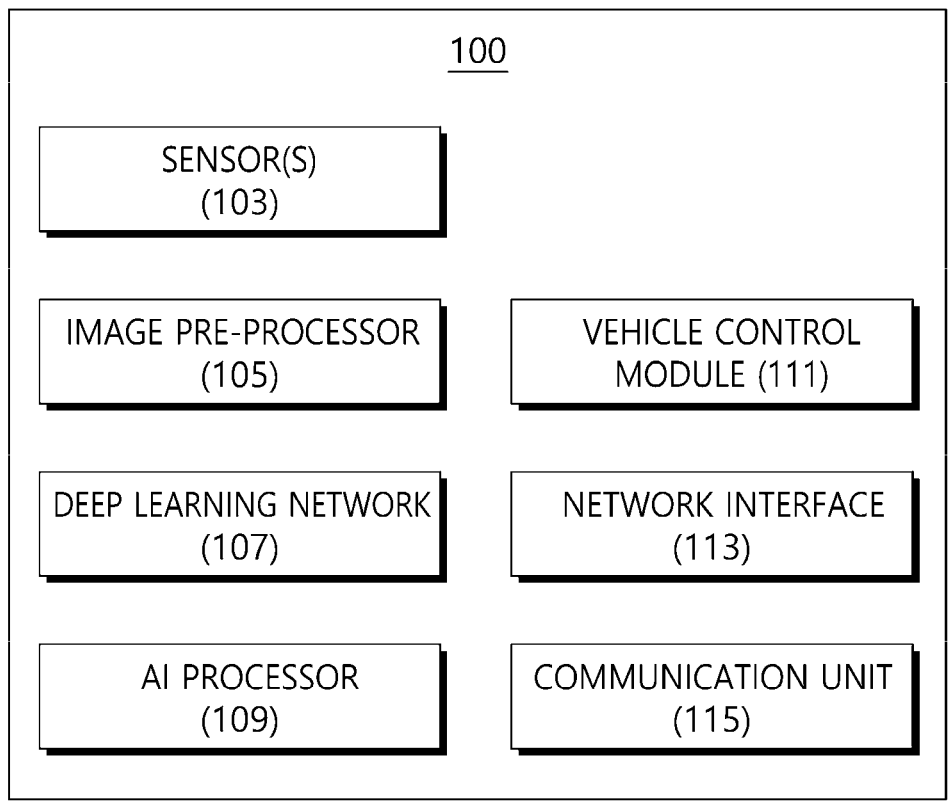
[FIG. 22]
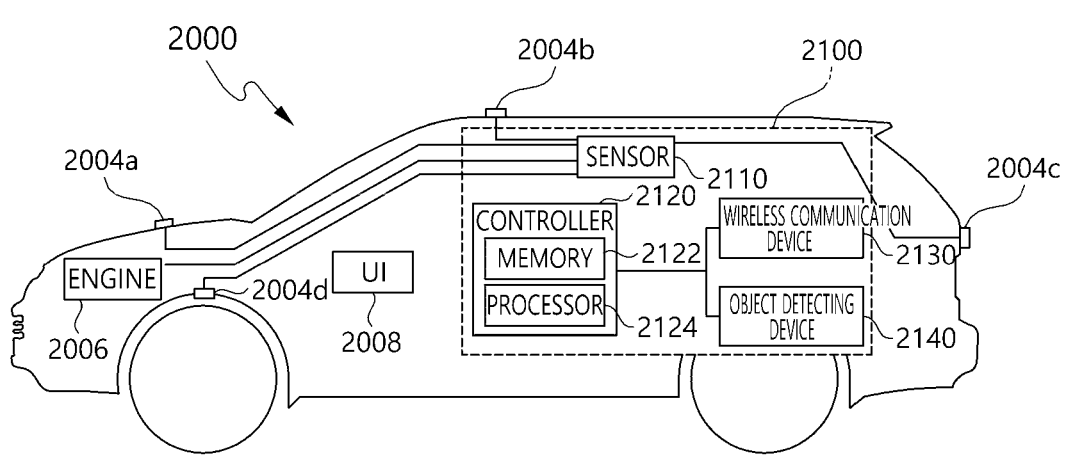

[FIG. 23]
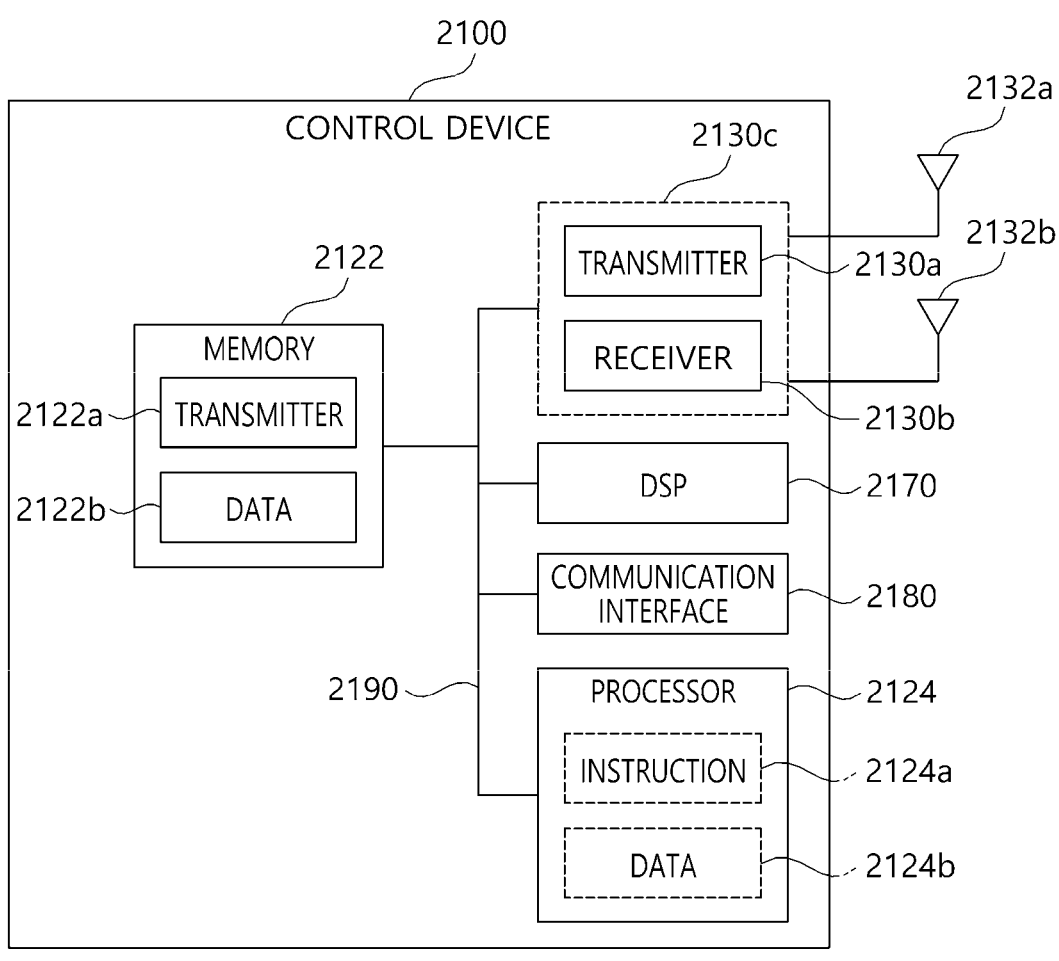

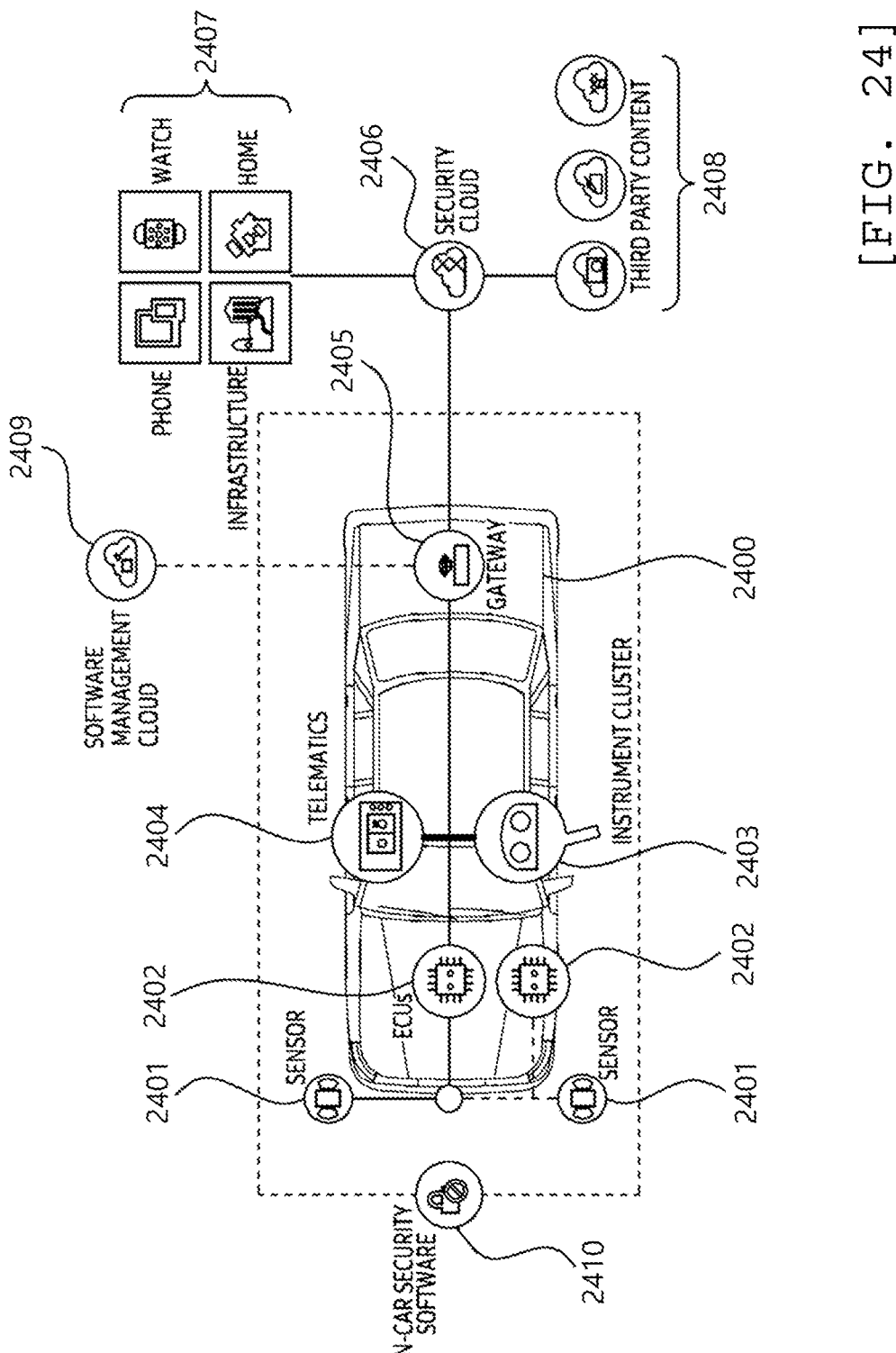
[FIG. 24]

[FIG. 25]
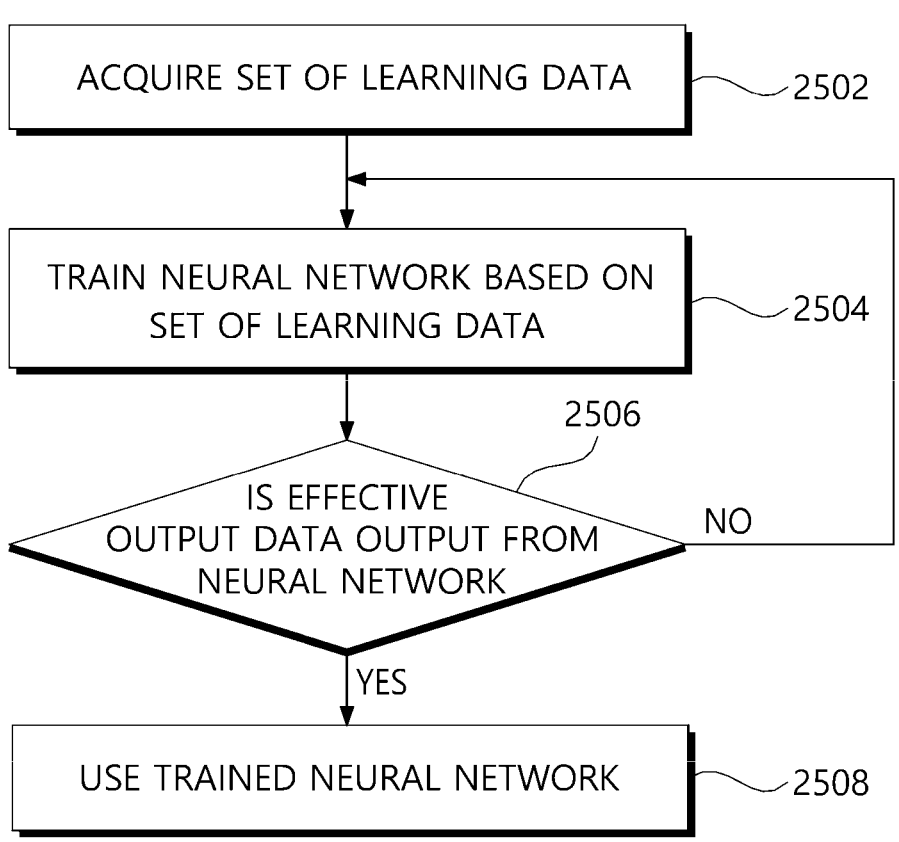

[FIG. 26]
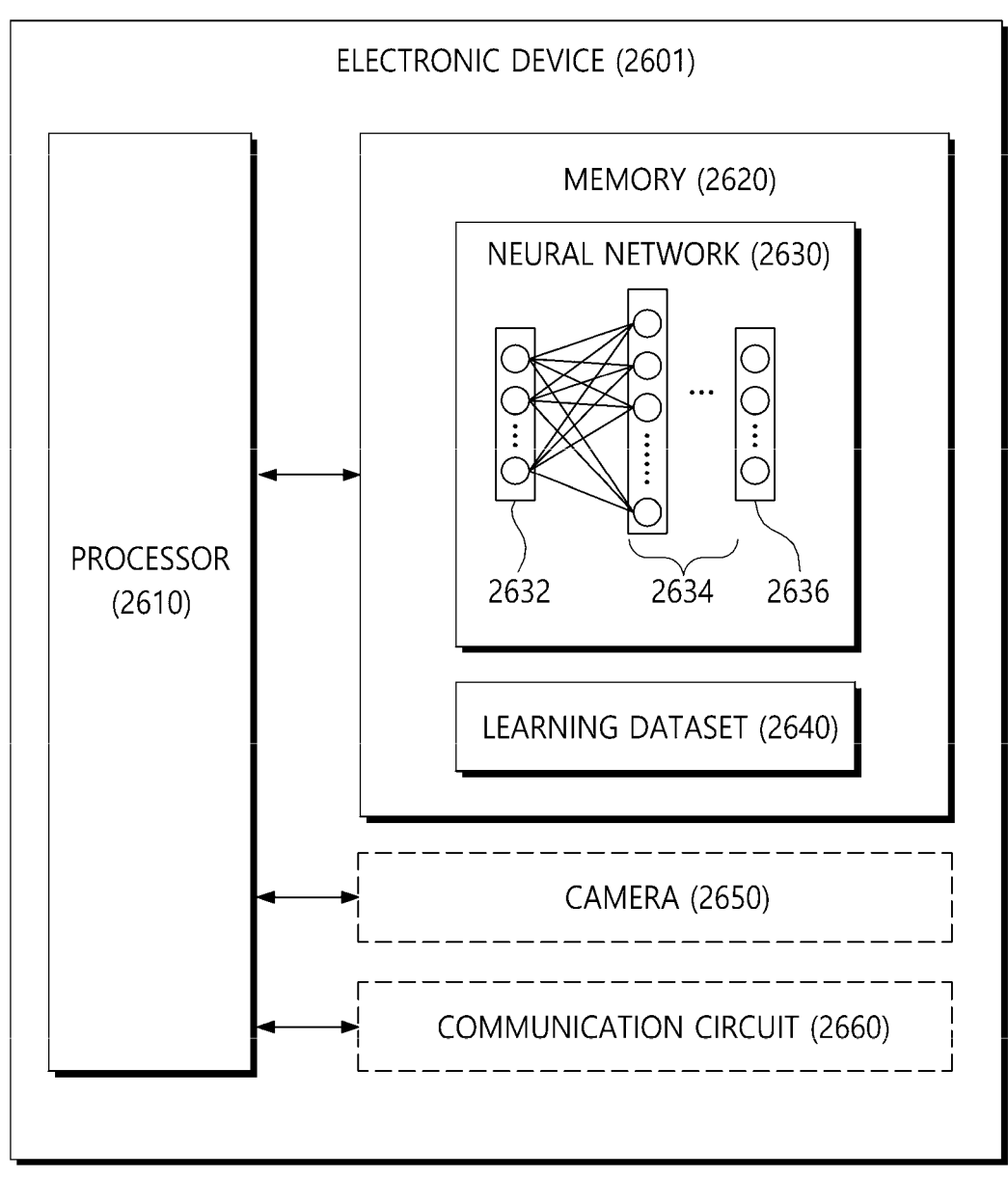

METHOD FOR RECONSTRUCTING 3D INFORMATION FROM 2D IMAGE AND METHOD AND APPARATUS FOR MEASURING DISTANCE BETWEEN VEHICLES USING THEREOF

BACKGROUND

Field

The present disclosure relates to a method for reconstructing 3D information from a 2D image captured from a camera mounted in a vehicle in driving and a method and an apparatus for measuring a distance between vehicles using the same.

Description of the Related Art

Recently, as an object recognition technology using a camera in the field of vehicles and mobility, machine vision or deep learning based object recognition technology is widely used. Specifically, the deep learning based object recognition technology may detect a region of the object from an image with a high hit rate. However, the object recognition technology detects a boundary of the object as a rectangular bounding box without distinguishing front, rear, side, front side, and rear side of the object (vehicle). However, it is difficult to obtain 3D information in the space with this detection result and thus it is difficult to expect the accurate measurement for a distance to the object.

As a supplement to the limitation of distance measurement through vision technology, in current commercial vehicles, a separate distance measurement device using a combination of a stereo camera configured by two cameras and a radar, a combination of a plurality of cameras (for example, eight cameras) and a radar, or a combination of a plurality of cameras and Lidar is being used.

In the meantime, in accordance with the rapid growth of deep learning technology, technologies such as 3D convolutional neural network (CNN) which analyzes 3D information from a 2D image have been developed, but the 3D CNN cannot operate in an embedded environment, but may operate only in a very high end GPU environment. For autonomous driving, a plurality of cameras is required to recognize rear and side directions as well as the front direction and cameras having a narrow field of view or a high resolution are required for long-distance recognition.

SUMMARY

An object to be achieved by the present disclosure is to provide a method for reconstructing 3D information from a 2D image and a method and an apparatus for measuring a distance between vehicles using the same which reconstruct 3D information, such as 3D bounding box which encloses a non-ego vehicle, from a 2D image captured by a camera mounted in a moving vehicle with a very small computational amount, without using expensive additional equipment such as radar or Lidar and a deep learning technique which requires a large computational amount and measure the distance from the non-ego vehicle using the same.

The technical object to be achieved by the present invention is not limited to the above-mentioned technical objects, and other technical objects, which are not mentioned above, can be clearly understood by those skilled in the art from the following descriptions.

In order to achieve the above-described technical objects, according to an aspect of the present disclosure, a method for measuring a distance between vehicles includes acquiring a 2D image obtained by capturing a non-ego vehicle using a camera mounted in an ego vehicle in driving; detecting a 2D bounding box which encloses the non-ego vehicle in the 2D image; detecting a 3D coordinate of at least one 3D vertex of a virtual 3D bounding box which encloses the non-ego vehicle in a 3D space, from a coordinate of a vertex of the 2D bounding box, using unprojection conversion from the 2D image to the 3D space, based on an intrinsic parameter of the camera and an extrinsic parameter with respect to the ego vehicle; and measuring a distance between the ego vehicle and the non-ego vehicle using the 3D coordinate of the at least one 3D vertex.

The extrinsic parameter is determined with respect to a 3D space coordinate system in which a first axis, a second axis, and a third axis are set according to a length direction, a width direction, and a height direction of the ego vehicle.

The detecting of a 3D coordinate includes: acquiring a first 3D coordinate and a second 3D coordinate from a first vertex and a second vertex on the lower edge of the 2D bounding box, by means of the unprojection conversion; acquiring a 3D intersection point of a first straight line which passes through the first 3D coordinate and is parallel to the first axis and a second straight line which passes through the second 3D coordinate and is parallel to the second axis, in the 3D space; and acquiring a 3D coordinate of a first 3D vertex using the 3D intersection point and a fourth vertex above the second vertex in the 2D bounding box.

The acquiring of a 3D coordinate of a first 3D vertex includes: acquiring a 2D coordinate from the 3D intersection point, by means of projection conversion from the 3D space to the 2D image; acquiring a 2D intersection point of a segment which connects the 2D coordinate and the fourth vertex and a segment which connects the first vertex and the second vertex, from the 2D image; and acquiring a 3D coordinate of the first 3D vertex, by means of the unprojection conversion, from the 2D intersection point.

The method for measuring a distance between vehicles further includes acquiring a third straight line which passes through the first 3D vertex and is parallel to the first axis and a fourth straight line which passes through the first 3D vertex and is parallel to the second axis, in the 3D space; acquiring a third straight and a fourth straight line in the 2D image, by means of the projection conversion from the 3D space into the 2D image, from the third straight line and the fourth straight line; acquiring a 3D coordinate of a second 3D vertex using a third straight line in the 2D image, the first vertex, and a third vertex above the first vertex in the 2D bounding box; and acquiring a 3D coordinate of a third 3D vertex using a fourth straight line in the 2D image, the second vertex, and a fourth vertex above the second vertex in the 2D bounding box.

The acquiring of a 3D coordinate of a second 3D vertex includes: a 2D intersection point of a third straight line in the 2D image and a segment which connects the first vertex and the third vertex is acquired and a 3D coordinate of the second 3D vertex is acquired from the 2D intersection point, by means of the unprojection conversion.

In the acquiring of a 3D coordinate of a third 3D vertex, a 2D intersection point of a third straight line in the 2D image and a segment which connects the first vertex and the third vertex is acquired and a 3D coordinate of the second 3D vertex is acquired from the 2D intersection point, by means of the unprojection conversion.

The method for measuring a distance between vehicles further includes acquiring a height of the non-ego vehicle in the 3D space; and acquiring a 3D coordinate of each of a fifth 3D vertex, a sixth 3D vertex, and a seventh 3D vertex, from a 3D coordinate of each of the first 3D vertex, the second 3D vertex, and the third 3D vertex and the height of the non-ego vehicle.

The acquiring of a height of the non-ego vehicle in the 3D space includes: acquiring a 2D coordinate from the third 3D vertex, by means of the unprojection conversion, drawing a circle which is centered on the 2D coordinate and passes through the fourth vertex in the 2D image, and acquiring a 2D intersection point of the circle and the fourth straight line in the 2D image; acquiring a 3D coordinate and a 3D intersection point from the 2D coordinate and the 2D intersection point, by means of the unprojection conversion; and acquiring the height of the non-ego vehicle with a distance between the 3D coordinate and the 3D intersection point in the 3D space.

In order to achieve the above-described technical objects, according to another aspect of the present disclosure, an apparatus for measuring a distance between vehicles includes an image acquiring unit which acquires a 2D image obtained by capturing a non-ego vehicle using a camera mounted in an ego vehicle in driving; a bounding box detecting unit which detects a 2D bounding box which encloses the non-ego vehicle in the 2D image; a 3D information reconstructing unit which detects a 3D coordinate of at least one 3D vertex of a virtual 3D bounding box which encloses the non-ego vehicle in a 3D space, from a coordinate of a vertex of the 2D bounding box, using unprojection conversion from the 2D image to the 3D space, based on an intrinsic parameter of the camera and an extrinsic parameter with respect to the ego vehicle; and a distance measuring unit which measures a distance between the ego vehicle and the non-ego vehicle using the 3D coordinate of the at least one 3D vertex.

The extrinsic parameter is determined with respect to a 3D space coordinate system in which a first axis, a second axis, and a third axis are set according to a length direction, a width direction, and a height direction of the ego vehicle.

The 3D information reconstructing unit acquires a first 3D coordinate and a second 3D coordinate from a first vertex and a second vertex on the lower edge of the 2D bounding box, by means of the unprojection conversion, acquires a 3D intersection point of a first straight line which passes through the first 3D coordinate and is parallel to the first axis and a second straight line which passes through the second 3D coordinate and is parallel to the second axis, in the 3D space, and acquires a 3D coordinate of a first 3D vertex using a fourth vertex above the second vertex, from the 3D intersection point and the 2D bounding box.

The 3D information reconstructing unit acquires a 2D coordinate from the 3D intersection point, by means of projection conversion from the 3D space to the 2D image, acquires a 2D intersection point of a segment which connects the 2D coordinate and the fourth vertex and a segment which connects the first vertex and the second vertex, in the 2D image, and acquires a 3D coordinate of the first 3D vertex, by means of the unprojection conversion, from the 2D intersection point.

The 3D information reconstructing unit acquires a third straight line which passes through the first 3D vertex and is parallel to the first axis and a fourth straight line which passes through the first 3D vertex and is parallel to the second axis, from the 3D space, acquires a third straight and a fourth straight line in the 2D image, by means of the projection conversion from the 3D space into the 2D image, from the third straight line and the fourth straight line, acquires a 3D coordinate of a second 3D vertex using a third straight line in the 2D image, the first vertex, and a third vertex above the first vertex in the 2D bounding box, and acquires a 3D coordinate of a third 3D vertex using a fourth straight line in the 2D image, the second vertex, and a fourth vertex above the second vertex in the 2D bounding box.

The 3D information reconstructing unit acquires a height of the non-ego vehicle in the 3D space, and acquires a 3D coordinate of each of a fifth 3D vertex, a sixth 3D vertex, and a seventh 3D vertex, from a 3D coordinate of each of the first 3D vertex, the second 3D vertex, and the third 3D vertex and the height of the non-ego vehicle.

In order to achieve the above-described technical objects, according to another aspect of the present disclosure, a method for reconstructing 3D information from a 2D image includes acquiring a 2D image obtained by capturing a non-ego vehicle using a camera mounted in an ego vehicle in driving; detecting a 2D bounding box which encloses the non-ego vehicle in the 2D image; and detecting a 3D coordinate of at least one 3D vertex of a virtual 3D bounding box which encloses the non-ego vehicle in a 3D space, from a coordinate of a vertex of the 2D bounding box, using unprojection conversion from the 2D image to the 3D space, based on an intrinsic parameter of the camera and an extrinsic parameter with respect to the ego vehicle.

According to the present disclosure, 3D information, such as 3D bounding box which encloses the non-ego vehicle, is reconstructed from the 2D image captured by the camera mounted in the vehicle in driving with a very small computational amount without help of expensive additional equipment such as a radar or a LIDAR and without using a deep learning technology which requires a large computational amount, and the distance from the non-ego vehicle may be measured using the same.

Effects of the present disclosure are not limited to the above-mentioned effects, and other effects, which are not mentioned above, can be clearly understood by those skilled in the art from the following descriptions.

BRIEF DESCRIPTION OF DRAWINGS

FIG. 1 illustrates a block diagram of an apparatus for measuring a distance between vehicles according to an exemplary embodiment of the present disclosure;

FIG. 2 illustrates a flowchart of a method for measuring a distance between vehicles according to an exemplary embodiment of the present disclosure;

FIG. 3 illustrates an example of an operation that captures the non-ego vehicle located at a rear left side of an ego vehicle by a camera mounted in the vicinity of a left side mirror of the ego vehicle;

FIG. 4 is a view illustrating an example in which a 2D bounding box for a non-ego vehicle identified from a 2D image acquired by a camera of an ego vehicle is displayed;

FIG. 5 illustrates an example of a result detecting 3D vertices of a virtual 3D bounding box which encloses a non-ego vehicle;

FIG. 6 illustrates conversion between 2D pixel coordinate system and a 3D space coordinate system (world coordinate system);

FIG. 7 illustrates an example of measuring a distance between an ego vehicle and a non-ego vehicle by capturing the non-ego vehicle located at a rear left side of the ego vehicle;

FIG. 8 illustrates an example of measuring a distance between an ego vehicle and a non-ego vehicle by capturing the non-ego vehicle located at a rear right side of the ego vehicle;

FIG. 9 illustrates an example of measuring a distance between an ego vehicle and a non-ego vehicle by capturing the non-ego vehicle located at a front left side of the ego vehicle;

FIG. 10 illustrates an example of measuring a distance between an ego vehicle and a non-ego vehicle by capturing the non-ego vehicle located at a front right side of the ego vehicle;

FIG. 11 is a flowchart illustrating step 230 of FIG. 2 in detail;

FIG. 12 illustrates a 3D intersection point M1 of a first straight line La and a second straight line Lb in a 3D space;

FIG. 13 is a flowchart illustrating step 1130 of FIG. 11 in detail;

FIG. 14 illustrates a 2D intersection point m2 in a 2D image;

FIG. 15 illustrates a 3D coordinate M2 acquired from a 2D intersection point m2;

FIG. 16 illustrates a third straight line ld and a fourth straight line lc in a 2D image;

FIG. 17 illustrates a 3D coordinate M3 acquired from a 2D intersection point m3 and a 3D coordinate M4 acquired from a 2D intersection point m4;

FIG. 18 is a flowchart illustrating step 230 of FIG. 2 in detail following FIG. 11;

FIG. 19 illustrates a 2D intersection point m5 of a circle which is centered on a 2D coordinate m4 and passes through a fourth vertex d and a fourth straight line lc;

FIG. 20 illustrates a 3D coordinate M4 and a 3D intersection point M5 acquired from a 2D coordinate m4 and a 2D intersection point m5;

FIG. 21 is a block diagram illustrating a vehicle autonomous system 100 to which exemplary embodiments of the present disclosure are applicable;

FIGS. 22 and 23 are block diagrams illustrating an example of an autonomous moving object to which exemplary embodiments of the present disclosure are applicable;

FIG. 24 is a block diagram illustrating another example of an autonomous moving object to which exemplary embodiments of the present disclosure are applicable;

FIG. 25 is a view for explaining an operation of an electronic device which trains a neural network based on a set of learning data, according to an exemplary embodiment; and FIG. 26 is a block diagram of an electronic device according to an example embodiment.

DETAILED DESCRIPTION OF THE EMBODIMENT

Hereinafter, exemplary embodiments of the present invention will be described in detail with reference to the drawings. Substantially same components in the following description and the accompanying drawings may be denoted by the same reference numerals and redundant description will be omitted. Further, in the description of the exemplary embodiment, if it is considered that specific description of related known configuration or function may cloud the gist of the present invention, the detailed description thereof will be omitted.

FIG. 1 illustrates a block diagram of a vehicle-to-vehicle distance measuring apparatus according to an exemplary embodiment of the present disclosure; Referring to FIG. 1, a vehicle-to-vehicle distance measurement apparatus 10 according to the exemplary embodiment includes an image acquiring unit 11. A bounding box detecting unit 12, a 3D information reconstructing unit 13, and a distance measuring unit 14.

The image acquiring unit 11 acquires a 2D image obtained by capturing the non-ego vehicle from a camera mounted in an ego vehicle in driving.

Here, driving of a vehicle means a state in which the vehicle is driven by a driver to be located on the road or a state in which the vehicle is located on the road by an autonomous driving system of the vehicle without driver's intervention and it may be a concept including a running state in which the vehicle is moving on the road and a stopped state or a parked state in which the vehicle is stopped on the road.

Cameras may be mounted to capture various directions in various positions of the vehicle. For example, the cameras can be mounted to capture the front, front left, front right, rear, rear left, and rear right sides of the vehicle.

The bounding box detecting unit 12 detects a 2D bounding box for an object (for example, non-ego vehicle or other vehicle) detected from the 2D image captured by the camera. A shape of the 2D bounding box for a non-ego vehicle detected according to one exemplary embodiment of the present disclosure may be a rectangular shape. A rectangle for the object may be determined by x and y coordinates of an upper left corner of the rectangle and x and y coordinates of a lower right corner. As another representing method of a bounding box which is generally used, the object is determined by a (x, y) axis coordinate of a center of the bounding box and a width and a height of the bounding box, but the present disclosure is not limited thereto.

For example, the bounding box detecting unit 12 according to the exemplary embodiment of the present disclosure detects a bounding box for an object from a 2D image captured by the camera, by means of a known deep learning technology for object detection/object perception, such as Tensorflow, region with CNN features (R-CNN), a region proposal network (RPN), you only look once (YOLO), single shot multibox detector (SSD), or retinaNet.

The 3D information reconstructing unit 13 detects a 3D coordinate corresponding to at least one 3D vertex of a virtual 3D bounding box enclosing the non-ego vehicle in the 3D space, from a coordinate corresponding to at least one vertex of the 2D bounding box detected by the bounding box detecting unit 12.

The 3D information constructing unit 13 detects the 3D coordinate of at least one 3D vertex of the virtual 3D bounding box by un-projecting a 2D image into a 3D space based on an intrinsic parameter of the camera and an extrinsic parameter with respect to the ego vehicle in which the camera is installed.

The distance measuring unit 14 measures a distance between the ego vehicle and the non-ego vehicle, using the 3D coordinate of at least one 3D vertex detected by the 3D information reconstructing unit 13. Here, the distance between the ego vehicle and the non-ego vehicle is identified as a shortest distance on the space of the ego vehicle and the non-ego vehicle. The shortest distance on the space of the ego vehicle and the non-ego vehicle according to the exemplary embodiment of the present disclosure may be a minimum distance between a bounding box which encloses the ego vehicle and a bounding box which encloses the non-ego vehicle on the plane.

The vehicle-to-vehicle distance measuring device 10 may be implemented by software, hardware, or a combination thereof. For example, according to the hardware implementation, it is implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and other electric units for performing a function.

Hereinafter, with reference to FIG. 2 illustrating a flowchart of a vehicle-to-vehicle distance measuring method according to an exemplary embodiment of the present disclosure, a vehicle-to-vehicle distance measuring apparatus 10 according to the exemplary embodiment of the present disclosure will be described in more detail.

In step 210, the image acquiring unit 11 acquires a 2D image obtained by capturing a non-ego vehicle from a camera mounted in an ego vehicle in driving.

In step 220, the bounding box detecting unit 12 detects the 2D bounding box which encloses the non-ego vehicle, from the 2D image captured by the camera.

FIG. 3 illustrates an example of an operation that captures a non-ego vehicle located at a rear left side of an ego vehicle by a camera mounted in the vicinity of a left side mirror of the ego vehicle.

FIG. 4 is a view illustrating an example in which a 2D bounding box for a non-ego vehicle identified from a 2D image acquired by a camera of an ego vehicle is displayed. Hereinafter, for the sake of convenience, as illustrated in FIGS. 3 and 4, an image obtained by capturing a rear left side of the ego vehicle will be described, but those skilled in the art may understand that the exemplary embodiments of the present disclosure may also be applied to images obtained by front, front left, front right, rear, and rear right of the ego vehicle.

Referring to FIG. 4, the bounding box which encloses the non-ego vehicle includes a first vertex a and a second vertex at the bottom and third vertex c and a fourth vertex d at the top.

Referring to FIG. 2 again, in step 230, the 3D information reconstructing unit 13 detects a 3D coordinate of at least one 3D vertex of a virtual 3D bounding box (for example, a cuboid) which encloses the non-ego vehicle in a 3D space, from a coordinate of a vertex of a 2D bounding box using unprojection conversion which converts the 2D image into a 3D space.

In the meantime, steps 210 to 230 of FIG. 2 correspond to a method of reconstructing 3D information from a 2D image according to the exemplary embodiment of the present disclosure.

FIG. 5 illustrates an example of a result of detecting 3D vertices of the virtual 3D bounding box which encloses the non-ego vehicle. Referring to FIG. 5, according to the exemplary embodiment of the present disclosure, the non-ego vehicle is identified by a virtual 3D bounding box which has eight vertices and six rectangle faces and three rectangle faces meeting at each vertex.

The vertices of the virtual 3D bounding box according to the exemplary embodiment of the present disclosure includes a first 3D vertex B, a second 3D vertex A, a third 3D vertex C, and a fourth 3D vertex D of the rectangle face located at the bottom, and a fifth 3D vertex F, a sixth 3D vertex E, a seventh 3D vertex G, and an eighth 3D vertex H located at the top, among one pair of rectangle faces which is parallel to the ground, among six faces (a total of three pairs of faces which configure the 3D bounding box) which configure the 3D bounding box. According to the exemplary embodiment of the present disclosure, 3D coordinates of the first 3D vertex B, the second 3D vertex A, the third 3D vertex C, and the fourth 3D vertex D, and the fifth 3D vertex F, the sixth 3D vertex E, the seventh 3D vertex G, and the eighth 3D vertex of the rectangular face located at the top may be detected.

FIG. 6 illustrates conversion between 2D pixel coordinate system and a 3D space coordinate system (world coordinate system).

Referring to FIG. 6, the 3D coordinate (X, Y, Z) on the world coordinate system is projected to a 2D pixel coordinate (x, y) on the 2D pixel coordinate system and in contrast, the 2D pixel coordinate (x, y) on the 2D pixel coordinate system may be unprojected to the 3D coordinate (X, Y, Z) on the world coordinate system.

The projection conversion may be performed by the following Equation.

$$s\begin{bmatrix} x \\ y \\ 1 \end{bmatrix} = \begin{bmatrix} f_x & 0 & c_x \\ 0 & f_y & c_y \\ 0 & 0 & 1 \end{bmatrix}\begin{bmatrix} r_{11} & r_{12} & r_{13} & t_x \\ r_{21} & 2_{22} & r_{23} & t_y \\ r_{31} & r_{32} & r_{33} & t_z \end{bmatrix}\begin{bmatrix} X \\ Y \\ Z \\ 1 \end{bmatrix} = K[R|t]\begin{bmatrix} X \\ Y \\ Z \\ 1 \end{bmatrix} \qquad \text{[Equation 1]}$$

Here, s refers to a scale factor of a homogeneous coordinate expression. $f_x$ and $f_y$ represent focal lengths of the camera and $c_x$ and $c_y$ indicate principal points. A matrix K, that is, $f_x$, $f_y$, $c_x$, $c_y$ correspond to intrinsic parameters of the camera. The matrix [R|t] is a matrix which transforms the world coordinate system into a camera coordinate system and corresponds to an extrinsic parameter of the camera. The extrinsic parameter indicates an installation position and an installation direction (pitch, yaw, roll) of the camera and is determined by a position and a direction of a camera with respect to the world coordinate system. Therefore, the extrinsic parameter varies depending on how the world coordinate system is defined.

The conversion of the unprojection of the 2D pixel coordinate (x, y) on the 2D pixel coordinate system into a 3D coordinate (X, Y, Z) on the world coordinate system may be obtained by the unprojection of the projection according to Equation 1.

The exemplary embodiments of the present disclosure use the unprojection conversion from the 2D image into the 3D space based on the intrinsic parameter of the camera and the extrinsic parameter with respect to the ego vehicle in which the camera is mounted. Here, the extrinsic parameter of the camera may be determined based on the 3D space coordinate system in which an arbitrary point (for example, a center of a quadrangle enclosing the ego vehicle on the ground) on the ground below the ego vehicle is as an origin and a first axis, a second axis, and a third axis are set according to a length direction, a width direction, and a height direction of the ego vehicle. For example, referring to FIG. 6, the origin O of the world coordinate system is a center of the quadrangle which encloses the ego vehicle on the ground and the directions of the X axis, the Y axis, and the Z axis may be a length direction, a width direction, and a height direction of the ego vehicle. Accordingly, the XY plane of the world coordinate system may become a ground on which the ego vehicle is placed. According to the exemplary embodiments of the present disclosure, when the non-ego vehicle is driven side by side with the ego vehicle or is driven in a lateral direction, if a height difference of the grounds on which the ego vehicle and the non-ego vehicle is small, a more accurate 3D coordinate detection result may be provided.

The intrinsic parameter and the extrinsic parameter of the camera may be acquired by the camera calibration in advance. The intrinsic parameter and the extrinsic parameter of the camera may be held by the 3D information reconstructing unit 13 or may be stored in a separate memory.

Referring to FIG. 2 again, in step 240, the distance measuring unit 14 may measure a distance between the ego vehicle and the non-ego vehicle using a 3D coordinate of at least one 3D vertex. The distance between the ego vehicle and the non-ego vehicle may be measured by a minimum distance between a rectangle enclosing the ego vehicle and a rectangle enclosing the non-ego vehicle on the plane. The rectangle enclosing the ego vehicle may be acquired from the specifications (length, width, and height) of the ego vehicle and the rectangle enclosing the non-ego vehicle is acquired using coordinates of vertices of the 3D bounding box which encloses the non-ego vehicle.

FIG. 7 illustrates an example of measuring a distance between an ego vehicle and a non-ego vehicle by capturing the non-ego vehicle located at a rear left side of the ego vehicle.

FIG. 8 illustrates an example of measuring a distance between an ego vehicle and a non-ego vehicle by capturing the non-ego vehicle located at a rear right side of the ego vehicle.

FIG. 9 illustrates an example of measuring a distance between an ego vehicle and a non-ego vehicle by capturing the non-ego vehicle located at a front left side of the ego vehicle.

FIG. 10 illustrates an example of measuring a distance between an ego vehicle and a non-ego vehicle by capturing the non-ego vehicle located at a front right side of the ego vehicle.

FIG. 11 is a flowchart illustrating step S230 of FIG. 2 in detail.

In step 1110, the 3D information reconstructing unit 13 acquires a first 3D coordinate Pa and a second 3D coordinate Pb from a first vertex a and a second vertex b of a lower edge of a 2D bounding box by means of the unprojection conversion. FIG. 12 illustrates the first 3D coordinate Pa and the second 3D coordinate Pb on the 3D space, acquired from the first vertex a and the second vertex b (see FIG. 4).

In step 1120, the 3D information reconstructing unit 13 acquires a 3D intersection point M1 of a first straight line La which passes through the first 3D coordinate Pa and is parallel to the first axis and a second straight line Lb which passes through the second 3D coordinate Pb and is parallel to the second axis, in the 3D space. FIG. 12 illustrates a 3D intersection point M1 of the first straight line La and the second straight line Lb.

In step 1130, the 3D information reconstructing unit 13 acquires the 3D coordinate of the first 3D vertex B using the 3D intersection point M1 and the fourth vertex d above the second vertex b in the 2D bounding box.

FIG. 13 is a flowchart illustrating step 1130 of FIG. 11 in detail.

In step 1132, the 3D information reconstructing unit 13 acquires a 2D coordinate m1 by means of the projection conversion from the 3D space into the 2D image, from the 3D intersection point M1. FIG. 14 illustrates a 2D coordinate m1 in the 2D image, acquired from the 3D intersection point M1 (see FIG. 12).

In step 1134, the 3D information reconstructing unit 13 acquires a 2D intersection point m2 of a segment which connects a 2D coordinate m1 and the fourth vertex d and a segment which connects the first vertex a and the second vertex d, in the 2D image. FIG. 14 illustrates a 2D intersection point m2.

In step 1136, the 3D information reconstructing unit 13 acquires the 3D coordinate M2 from the 2D intersection point m2 by means of the unprojection conversion. FIG. 15 illustrates a 3D coordinate M2 acquired from a 2D intersection point m2. The 3D coordinate M2 acquired as described above becomes a 3D coordinate of a first 3D vertex B of FIG. 5.

Referring to FIG. 11 again, in step 1140, the 3D information reconstructing unit 13 acquires a third straight line Ld which passes through the 3D coordinate M2, that is, the first 3D vertex B and is parallel to the first axis and a fourth straight line Lc which passes through the 3D coordinate M2, that is, the first 3D vertex B and is parallel to the second axis, in the 3D space. FIG. 15 illustrates a third straight line Ld and a fourth straight line Lc on a 3D space.

In step 1150, the 3D information reconstructing unit 13 acquires the third straight line ld and the fourth straight line lc in the second image, from the third straight line Ld and the fourth straight line Lc, by means of the projection conversion from the 3D space to the 2D image. FIG. 16 illustrates a third straight line ld and a fourth straight line lc in a 2D image.

In step 1160, the 3D information reconstructing unit 13 may acquires a 3D coordinate of a second 3D vertex A using the third straight line ld in the 2D image and the first vertex a and the third vertex c above the first vertex a in the 2D bounding box. Specifically, referring to FIG. 16, a 2D intersection point m3 of the third straight line ld in the 2D image and a segment which connects the first vertex a and the third vertex c may be acquired. The 3D coordinate M3 may be acquired from the 2D intersection point m3 by means of the unprojection conversion as illustrated in FIG. 17. The 3D coordinate M3 acquired as described above becomes a 3D coordinate of a second 3D vertex A of FIG. 5.

In step 1170, the 3D information reconstructing unit 13 may acquire a 3D coordinate of a third 3D vertex C using the fourth straight line lc in the 2D image and the second vertex b and the fourth vertex d above the second vertex d in the 2D bounding box. Specifically, referring to FIG. 16, a 2D intersection point m4 of the fourth straight line lc in the 2D image and a segment which connects the second vertex b and the fourth vertex d may be acquired. The 3D coordinate M4 may be acquired from the 2D intersection point m4 by means of the unprojection conversion as illustrated in FIG. 17. The 3D coordinate M4 acquired as described above becomes a 3D coordinate of a third 3D vertex C of FIG. 5.

In step 1180, the 3D information reconstructing unit 13 acquires a 3D coordinate of a fourth 3D vertex D using 3D coordinates of a first 3D vertex B, a second 3D vertex A, and a third 3D vertex C. Here, the 3D coordinate of the fourth 3D vertex D may be acquired by the law of parallelogram. For example, referring to FIG. 5, the 3D coordinate of the fourth 3D vertex D may be obtained by an intersection point of a segment which passes through the point A and is parallel to a segment BC and a segment which passes through the point C and is parallel to a segment AB.

FIG. 18 is a flowchart illustrating step 230 of FIG. 2 in detail following FIG. 11.

The following steps 1810 to 1830 are processes for acquiring a height of the non-ego vehicle in the 3D space.

In step 1810, the 3D information reconstructing unit 13 acquires the 2D coordinate m4 from the 3D coordinate M4, that is, the third 3D vertex C, by means of the unprojection conversion and draws a circle which is centered on the 2D coordinate m4 and passes through the fourth vertex D in the 2D image, and acquires the 2D intersection point m5 of the circle and the fourth straight Ic in the 2D image. FIG. 19 illustrates a 2D intersection point m5 of a circle which is centered on a 2D coordinate m4 and passes through a fourth vertex d and a fourth straight line lc.

In FIG. 19, a height of the non-ego vehicle in the 3D space corresponds to a segment which connects the 2D coordinate m4 and the fourth vertex d. It is considered that a radius of the circle which is centered on the 2D coordinate m4 and passes through the fourth vertex d is equal to a height of the non-ego vehicle during the process of mapping the circle to a sphere on the 3D space. Therefore, when the distance on the 3D space between the 2D coordinate m4 and the 2D intersection point m5 is measured, the height of the non-ego vehicle may be acquired.

In step 1820, the 3D information reconstructing unit 13 acquires the 3D coordinate M4 and the 3D intersection point M5 from the 2D coordinate m4 and the 2D intersection point m5 by means of the unprojection conversion. FIG. 20 illustrates a 3D coordinate M4 and a 3D intersection point M5 acquired from a 2D coordinate m4 and a 2D intersection point m5 of FIG. 19, by means of the unprojection conversion.

In step 1830, the 3D information reconstructing unit 13 acquires the height of the non-ego vehicle by measuring a distance between the 3D coordinate M4 and the 3D intersection M5 in the 3D space.

In step 1840, the 3D information reconstructing unit 13 acquires a 3D coordinate of each of a fifth 3D vertex F, a sixth 3D vertex E, a seventh 3D vertex G, and an eighth 3D vertex H from a 3D coordinate of each of the first 3D vertex B, a second 3D vertex A, a third 3D vertex C, and a fourth 3D vertex D and a height of the non-ego vehicle. For example, the 3D coordinate of the fifth 3D vertex F may be obtained as a coordinate which is spaced apart from the first 3D vertex B by a height of the vehicle in the third axis direction.

According to the exemplary embodiments of the present disclosure, a distance from the non-ego vehicle may be accurately measured with a very small computational amount, from an image acquired by the single camera without using a separate radar or expensive LIDAR equipment.

Moreover, the 3D vertex detection result of the virtual 3D bounding box which encloses the non-ego vehicle according to the exemplary embodiment of the present disclosure may not only measure a distance to the non-ego vehicle, but also be utilized for various purposes.

For example, the length, the width, and the height of the 3D bounding box correspond to the length, the width, and the height of the non-ego vehicle so that a type of vehicle (a sedan, SUV, a Van, a bus, a small truck, or a large truck) may be classified using the length, the width, and the height of the 3D bounding box as vehicle specifications. A technique that classifies a vehicle type of the surrounding vehicle using the deep learning image analysis and expresses the image of the vehicle according to the vehicle type through a cluster is being used, but the deep learning image analysis may provide a wrong classification result. According to the exemplary embodiment of the present disclosure, a length, a width, and a height of a 3D bounding box which encloses a vehicle in the 3D space are measured to acquire an accurate specification of the vehicle so that a more accurate vehicle type classification result may be provided.

The vehicle type classification result may be acquired by combining the vehicle type classification result by means of the deep learning image analysis and a vehicle type classification result according to the vehicle specification using the 3D bounding box. For example, basically, the vehicle type is classified by the deep learning image analysis and the vehicle type classification result according to the vehicle specification may be utilized as an alternative or supplementary. When the vehicle type classification result by the deep learning image analysis and the vehicle type classification result according to the vehicle specification are different, the vehicle type classification result according to the vehicle specification is determined as ground truth data (an actual value of the data) and the vehicle type classification result according to the vehicle specification determined above may be used to retrain the deep learning model.

FIG. 21 is a block diagram illustrating a vehicle autonomous system 100 to which exemplary embodiments of the present disclosure are applicable.

The autonomous driving system 100 of a vehicle according to FIG. 21 may be a deep learning network including sensors 103, an image preprocessor 105, a deep learning network 107, an artificial intelligence (AI) processor 109, a vehicle control module 111, a network interface 113, and a communication unit 115. In various exemplary embodiments, each element may be connected through various interfaces. For example, sensor data which is sensed by the sensors 103 to be output may be fed to the image preprocessor 105. The sensor data processed by the image preprocessor 105 may be fed to the deep learning network 107 which is run by the AI processor 109. An output of the deep learning network 107 ran by the AI processor 109 may be fed to the vehicle control module 111. Intermediate results of the deep learning network 107 ran by the AI processor 109 are fed to the AI processor 109. In various exemplary embodiments, the network interface 113 performs communication with the electronic device in the vehicle to transmit autonomous driving route information and/or autonomous driving control instructions for autonomous driving of the vehicle to the internal block configurations. In one exemplary embodiment, the network interface 131 may be used to transmit sensor data acquired by the sensor(s) 103 to the external server. In some exemplary embodiment, the autonomous driving control system 100 includes additional or less configurations appropriately. For example, in some exemplary embodiment, the image preprocessor 105 may be an optional component. As another example, the post-processing component (not illustrated) may be included in the autonomous driving control system 100 to perform the post processing at the output of the deep learning network 107 before providing the output to the vehicle control module 111.

In some exemplary embodiment, the sensors 103 include one or more sensors. In various exemplary embodiments, the sensors 103 may be attached to different positions of the vehicle. The sensors 103 may be directed to one or more different directions. For example, the sensors 103 may be attached to the front, sides, rear, and/or roof of the vehicle to be directed to the forward facing, rear facing, and side facing directions. In some exemplary embodiment, the sensors 903 may be image sensors such as high dynamic range cameras. In some exemplary embodiment, sensors 103 include non-visual sensors. In some exemplary embodiment, sensors 103 include a RADAR, a light detection and ranging (LiDAR) and/or ultrasonic sensors in addition to the image sensor. In some exemplary embodiment, the sensors 103 are not mounted in a vehicle including a vehicle control module 111. For example, the sensors 103 are included as a part of a deep learning system for capturing sensor data and are attached to an environment or a road and/or mounted in neighbor vehicles.

In some exemplary embodiment, an image pre-processor 105 may be used to pre-process sensor data of the sensors 103. For example, the image pre-processor 105 may be used to split sensor data by one or more configurations and/or post-process one or more configurations to pre-process the sensor data. In some exemplary embodiment, the image preprocessor 105 may be a graphics processing unit (GPU), a central processing unit (CPU), an image signal processor, or a specialized image processor. In various exemplary embodiments, the image pre-processor 105 may be a tone-mapper processor for processing high dynamic range data. In some exemplary embodiment, the image preprocessor 105 may be a configuration of the AI processor 109.

In some exemplary embodiment, the deep learning network 107 may be a deep learning network for implementing control instructions to control the autonomous vehicle. For example, the deep learning network 107 may be an artificial neural network, such as a convolution neural network CNN trained using sensor data and an output of the deep learning network 107 is provided to the vehicle control module 111.

In some exemplary embodiment, the artificial intelligence (AI) processor 109 may be a hardware processor to run the deep learning network 107. In some exemplary embodiment, the AI processor 109 is a specialized AI processor to perform the inference on the sensor data through the convolution neural network (CNN). In some exemplary embodiment, the AI processor 109 may be optimized for a bit depth of the sensor data. In some exemplary embodiment, the AI processor 109 may be optimized for the deep learning operations such as operations of the neural network including convolution, inner product, vector and/or matrix operations. In some exemplary embodiment, the AI processor 109 may be implemented by a plurality of graphics processing units GPU to effectively perform the parallel processing.

In various exemplary embodiments, the AI processor 109 performs deep learning analysis on sensor data received from the sensor(s) 103 while the AI processor 109 is executed and is coupled to a memory configured to provide the AI processor having instructions which cause a machine learning result used to autonomously at least partially operate the vehicle through the input/output interface. In some exemplary embodiment, the vehicle control module 111 is used to process instructions to control a vehicle output from the artificial intelligence (AI) processor 1509 and translate an output of the AI processor 109 into instructions for controlling a module of each vehicle to control various modules of the vehicle. In some exemplary embodiment, the vehicle control module 111 is used to control a vehicle for autonomous driving. In some exemplary embodiment, the vehicle control module 111 adjusts steering and/or a speed of the vehicle. For example, the vehicle control module 111 may be used to control the driving of the vehicle such as deceleration, acceleration, steering, lane change, and lane keeping. In some exemplary embodiment, the vehicle control module 111 may generate control signals to control vehicle lighting, such as brake lights, turn signals, and headlights. In some exemplary embodiment, the vehicle control module 111 may be used to control vehicle audio related systems, such as a vehicle's sound system, vehicle's audio warnings, a vehicle's microphone system, a vehicle's horn system.

In some exemplary embodiment, the vehicle control module 111 may be used to control notification systems including warning systems to notify passengers and/or drivers of driving events, such as access to an intended destination or potential collision. In some exemplary embodiment, the vehicle control module 111 may be used to adjust sensors such as sensors 103 of the vehicle. For example, the vehicle control module 111 may modify an orientation of sensors 103, change an output resolution and/or a format type of the sensors 103, increase or reduce a capture rate, adjust a dynamic range, and adjust a focus of the camera. Further, the vehicle control module 111 may individually or collectively turn on/off operations of the sensors.

In some exemplary embodiment, the vehicle control module 111 may be used to change parameters of the image pre-processor 105 by modifying a frequency range of filters, adjusting edge detection parameters for detecting features and/or objects, or adjusting a bit depth and channels. In various exemplary embodiments, the vehicle control module 111 may be used to control an autonomous driving function of the vehicle and/or a driver assistance function of the vehicle.

In some exemplary embodiment, the network interface 113 may be in charge of an inner interface between block configurations of the autonomous driving control system 100 and the communication unit 115. Specifically, the network interface 113 may be a communication interface to receive and/or send data including voice data. In various exemplary embodiments, the network interface 913 may be connected to external servers to connect voice calls through the communication unit 915, receive and/or send text messages, transmit sensor data, update software of the vehicle to an autonomous driving system, or update software of the autonomous driving system of the vehicle.

In various exemplary embodiments, the communication unit 115 includes various wireless interfaces such as cellular or WiFi. For example, the network interface 113 may be used to receive update for operating parameters and/or instructions for the sensors 103, the image pre-processor 105, the deep learning network 107, the AI processor 109, and the vehicle control module 111 from the external server connected through the communication unit 115. For example, the machine learning model of the deep learning network 107 may be updated using the communication unit 115. According to another example, the communication unit 115 may be used to update the operating parameters of the image preprocessor 105, such as image processing parameters, and/or the firmware of the sensors 103.

In another exemplary embodiment, the communication unit 115 may be used to activate emergency services and the communication for emergency contact in an accident or a near-accident event. For example, in a collision event, the communication unit 115 may be used to call emergency services for help and used to notify emergency services of collision details and emergency services of the location of the vehicle to the outside. In various exemplary embodiments, the communication unit 115 updates or acquires an expected arrival time and/or a destination location.

According to an exemplary embodiment, the autonomous driving system 100 illustrated in FIG. 21 may be configured by an electronic device of the vehicle. According to an exemplary embodiment, when an autonomous driving release event occurs from the user during the autonomous driving of the vehicle, the AI processor 109 of the autonomous driving system 100 controls to input autonomous driving release event related information as training set data of the deep learning network to train autonomous driving software of the vehicle.

FIGS. 22 and 23 are block diagrams illustrating an example of an autonomous moving object to which exemplary embodiments of the present disclosure are applicable. Referring to FIG. 22, an autonomous moving object 2000 according to the present exemplary embodiment includes a control device 2100, sensing modules 2004*a*, 2004*b*, 2004*c*, 2004*d*, an engine 2004, and a user interface 2008.

The autonomous moving object 2000 may include an autonomous mode or a manual mode. For example, the manual mode is switched to the autonomous model or the autonomous mode is switched to the manual mode in accordance with the user input received through the user interface 2008.

When the moving object 2000 operates in the autonomous mode, the autonomous moving object 2000 may operate under the control of the control device 2100.

In the present exemplary embodiment, the control device 2100 may include a controller 2120 including a memory 2122 and a processor 2124, a sensor 2110, a communication device 2130, and an object detection device 2140.

Here, the object detection device 2140 may perform all or some functions of the above-described distance measurement device 10.

That is, in the present exemplary embodiment, the object detection device 2140 is a device for detecting an object located outside the moving object 2000 and the object detection device 2140 detects an object located outside of the moving object 2000 and generates object information according to the detection result.

The object information includes information about the presence of the object, object location information, distance information between the moving object and the object, and relative speed information with the moving object and the object.

The object may include various objects located at the outside of the moving object 2000, such as lanes, the other vehicle, pedestrians, traffic signals, lights, roads, structures, speed bumps, terrain objects, and animals. Here, the traffic signal may be a concept including a traffic light, a traffic sign, and a pattern or text drawn on the road surface. The light may be light generated from a lamp equipped in the vehicle, light generated from a streetlamp, or sunlight.

The structure may be an object which is located in the vicinity of the road and is fixed to the ground. For example, the structure includes street lights, street trees, buildings, power poles, traffic lights, and bridges. The terrain object may include mountains and hills.

Such an object detection device 2140 includes a camera module. The controller 2120 extracts object information from an external image captured by the camera module and allows the controller 2120 to process the information thereabout.

Further, the object detection device 2140 further includes imaging devices to recognize the external environment. In addition to the LIDAR, a RADAR, a GPS device, an odometry, and other computer vision device, an ultrasonic sensor, and an IR sensor may be used and if necessary, the devices selectively or simultaneously operate for more accurate sensing.

In the meantime, the distance measurement device 10 according to the exemplary embodiment of the present disclosure calculates a distance between the autonomous moving object 2000 and the object and interworks with the control device 2100 of the autonomous moving object 2000 to control the operation of the moving object based on the calculated distance.

For example, when there is a possibility of collision depending on the distance between the autonomous moving object 2000 and the object, the autonomous moving object 2000 decelerates or controls the brake to stop. As another example, when the object is a moving object, the autonomous moving object 2000 controls a driving speed of the autonomous moving object 2000 to maintain a predetermined distance or more from the object.

The distance measuring device 10 according to the exemplary embodiment of the present disclosure is configured by one module in the control device 2100 of the autonomous moving object 2000. That is, the memory 2122 and the processor 2124 of the control device 2100 may implement the collision preventing method according to the present disclosure in a software manner.

Further, the sensor 2110 connects the moving object internal/external environment to the sensing modules 2004*a*, 2004*b*, 2004*c*, and 2004*d* to acquire various sensing information. Here, the sensor 2110 includes a posture sensor (for example, a yaw sensor, a roll sensor, and a pitch sensor), a collision sensor, a wheel sensor, a speed sensor, an inclination sensor, a weight sensor, a heading sensor, a gyro sensor, a position module, a moving object forward/backward sensor, a battery sensor, a fuel sensor, a tire sensor, a steering sensor by steering wheel rotation, an internal temperature sensor of a moving object, an internal humidity sensor of the moving object, an ultrasonic sensor, an illumination sensor, an accelerator pedal position sensor, and a brake pedal position sensor.

Accordingly, the sensor 2110 may acquire sensing signals about moving object posture information, moving object collision information, moving object direction information, moving object location information (GPS information), moving object angle information, moving object speed information, moving object acceleration information, moving object inclination information, moving object forward/backward information, battery information, fuel information, tire information, moving object lamp information, internal temperature information of the moving object, internal humidity information of the moving object, a steering wheel rotation angle, an external illumination of the moving object, a pressure applied to an acceleration pedal, or a pressure applied to a brake pedal.

Further, the sensor 2110 may further include an acceleration pedal sensor, a pressure sensor, an engine speed sensor, an air flow sensor, an air temperature sensor (ATS), a water temperature sensor (WTS), a throttle position sensor (TPS), a TDC sensor, and a crank angle sensor (CAS).

As described above, the sensor 2110 generates moving object state information based on the sensing data.

The wireless communication device 2130 is configured to implement wireless communication with the autonomous moving object 2000. For example, the autonomous moving object 2000 may be allowed to communicate with a mobile phone of the user or other wireless communication device 2130, other moving object, a central device (a traffic control device), or a server. The wireless communication device 2130 may transmit/receive a wireless signal according to an access wireless protocol. The wireless communication protocol may be Wi-Fi, Bluetooth, long-term evolution (LTE), code division multiple access (CDMA), wideband code division multiple access (WCDMA), global Systems for mobile communications (GSM).

Further, in the present exemplary embodiment, the autonomous moving object 2000 may implement a communication between moving objects by means of the wireless communication device 2130. That is, the wireless communication device 2130 may communicate with the other object on the road and the other objects by the vehicle to vehicle (V2V) communication. The autonomous moving object 2000 transmits and receives information such as a driving warning or traffic information by means of the vehicle to vehicle communication and may request information from the other moving object or receive a request. For example, the wireless communication device 2130 may perform the V2V communication with a dedicated short-range communication (DSRC) device or a cellular-V2V (C-V2V) device. Further, in addition to the vehicle to vehicle communication, a vehicle to everything (V2X) communication (for example, with an electronic device carried by a pedestrian) is also implemented by the wireless communication device 2130.

In the present exemplary embodiment, the controller 2120 is a unit which controls overall operations of each unit in the moving object 2000 and is configured by a manufacturer of the moving object during the manufacturing process or additionally configured for performing the function of the autonomous function after the manufacturing. Alternatively, a configuration for consistently performing an additional function is included by upgrading the controller 2120 configured during the manufacturing. The controller 2120 is referred to as an electronic control unit (ECU).

The controller 2120 collects various data from the connected sensor 2110, object detection device 2140, and communication device 2130 and transmits a control signal to the sensor 2110, the engine 2006, the user interface 2008, the communication device 2130, and the object detection device 2140 which are included in the moving object as other configurations, based on the collected data. Further, even though it is not illustrated in the drawing, the control signal is also transmitted to the acceleration device, the braking system, the steering device, or the navigation device which is related to the driving of the moving object.

In the present exemplary embodiment, the controller 2120 controls the engine 2006 and for example, senses a speed limit of a road on which the autonomous moving object 2000 is driving to control the engine 2006 such that the driving speed does not exceed the speed limit or to accelerate the driving speed of the autonomous moving object 2000 within a range which does not exceed the speed limit.

Further, when the autonomous moving object 2000 approaches the lane or moves out of the lane during the driving of the autonomous moving object 2000, the controller 2120 determines whether the approaching and moving out of the lane is caused according to the normal driving situation or the other driving situation, and controls the engine 2006 to control the driving of the moving object according to the determination result. Specifically, the autonomous moving object 2000 may detect a lane formed on both sides of a lane on which the moving object is driving. In this case, the controller 2120 determines whether the autonomous moving object 2000 does not approach the lane or moves out of the lane, and if it is determined that the autonomous moving object 2000 approaches the lane or moves out of the lane, it is determined that the driving is performed according to the accurate driving situation or other driving situation. Here, as an example of the normal driving situation, it may be necessary to change the lane of the moving object. Further, as an example of the other driving situation, it is not necessary for the moving object to change the lane. If it is determined that the autonomous moving object 2000 approaches the lane or moves out of the lane in a situation where it is not necessary for the moving object to change the lane, the controller 2120 controls the driving of the autonomous moving object 2000 to normally drive without moving out of the lane.

When there is another moving object or an obstacle in front of the moving object, an engine 2006 or a braking system is controlled to reduce the speed of the driving moving object and also control a trajectory, a driving route, and a steering angle in addition to the speed. Alternatively, the controller 2120 generates a necessary control signal according to recognition information of other external environment, such as a driving lane and a driving signal of the moving object to control the driving of the moving object.

The controller 2120 communicates with a neighbor moving object or a central server in addition to the autonomous generation of the control signal and transmits an instruction to control the peripheral devices through the received information to control the driving of the moving object.

Further, when the position of the camera module or the viewing angle is changed, it is difficult to accurately recognize the moving object or the lane according to the present exemplary embodiment so that in order to prevent this, the controller 2120 generates a control signal for controlling the calibration of the camera module. Accordingly, according to the present exemplary embodiment, the controller 2120 generates a calibration control signal to the camera module so that even though a mounting position of the camera module is changed by vibration or impact which is generated according to the movement of the autonomous moving object 2000, a normal mounting position, a direction, or a viewing angle of the camera module are consistently maintained. When initial mounting position, direction, and viewing angle information of the camera module which are stored in advance and initial mounting position, direction, and viewing angle information of the camera module which are measured during the driving of the autonomous moving object 2000 are changed by a threshold value or more, the controller 2120 generates a control signal to perform calibration of the camera module.

In the present exemplary embodiment, the controller 2120 includes a memory 2122 and a processor 2124. The processor 2124 executes software stored in the memory 2122 according to a control signal of the controller 2120. Specifically, the controller 2120 stores data and instructions for performing a distance measuring method according to the present disclosure in the memory 2122 and the instructions may be executed by the processor 2124 to implement one or more methods disclosed herein.

At this time, the memory 2122 is stored in a nonvolatile recording medium which is executable in the processor 2124. The memory 2122 stores software and data through appropriate internal and external devices. The memory 2122 may be configured by a random access memory (RAM), a read only memory (ROM), a hard disk, and a memory 2122 connected to a dongle.

The memory 2122 at least stores an operating system (OS), a user application, and executable instructions. The memory 2122 also stores application data and array data structures.

The processor 2124 is a microprocessor or an appropriate electronic processor and may be a controller, a micro controller, or a state machine.

The processor 2124 is implemented by a combination of computing devices and the computing device may be a digital signal processor or a microprocessor or may be configured by an appropriate combination thereof.

In the meantime, the autonomous moving object 2000 may further include a user interface 2008 for an input of the user to the above-described control device 2100. The user interface 2008 may allow the user to input the information by appropriate interaction. For example, the user interface may be implemented as a touch screen, a keypad, or a manipulation button. The user interface 2008 transmits an input or an instruction to a controller 2120 and the controller 2120 may perform a control operation of a moving object as a response of the input or the instruction.

Further, the user interface 2008 is a device outside the autonomous moving object 2000 and communicates with the autonomous moving object 2000 by means of a wireless communication device 2130. For example, the user interface 2008 interworks with a mobile phone, a tablet, or other computer device.

Moreover, in the present exemplary embodiment, even though it has been described that the autonomous moving object 2000 includes an engine 2006, another type of propulsion system is also included. For example, the moving object may be operated with an electric energy and also operated by a hydrogen energy or a hybrid system combining them. Accordingly, the controller 2120 includes a propulsion mechanism according to the propulsion system of the autonomous moving object 2000 and provides a control signal thereby to configurations of each propulsion mechanism.

Hereinafter, a detailed configuration of the control device 2100 according to the exemplary embodiment will be described in more detail with reference to FIG. 23.

The control device 2100 includes a processor 2124. The processor 2124 may be a general-purpose single or multi-chip microprocessor, a dedicated microprocessor, a microcontroller, or a programmable gate array. The processor is also referred to as a central processing unit (CPU). Further, in the present exemplary embodiment, the processor 2124 may also be used by a combination of a plurality of processors.

The control device 2100 includes a memory 2122. The memory 2122 may be an arbitrary electronic component which stores electronic information. The memory 2122 also includes a combination of the memories 2122 in addition to the single memory.

Data and instructions 2122a for performing a distance measuring method of a distance measuring device 10 according to the present disclosure may be stored in the memory 2122. When the processor 2124 executes the instruction 2122a, all or some of the instructions 2122a and data 2122b required to perform the instruction may be loaded (2124a and 2124b) on the processor 2124.

The control device 2100 may include a transmitter 2130a, a receiver 2130b, or a transceiver 2130c to permit the transmission and reception of signals. One or more antennas 2132a and 2132b may be electrically connected to the transmitter 2130a, the receiver 2130b, or the transceiver 2130c and further includes antennas.

The control device 2100 may include a digital signal processor (DSP) 2170. The moving object may quickly process the digital signal by means of the DSP 2170.

The control device 2100 includes a communication interface 2180. The communication interface 2180 may include one or more ports and/or communication modules to connect the other devices to the control device 2100. The communication interface 2180 may allow the user and the control device 2100 to interact with each other.

Various configurations of the control device 2100 may be connected by one or more buses 2190 and the buses 2190 includes a power bus, a control signal bus, a state signal bus, and a data bus. Configurations may perform a desired function of transmitting information with each other through the bus 2190 in response to the control of the processor 2124.

In the meantime, according to various exemplary embodiments, the control device 2100 may be related to a gateway for the communication with a security cloud. For example, referring to FIG. 24, the control device 2100 may be related to a gateway 2405 to transmit information acquired from at least one of the components 2401 to 2404 of the vehicle 2400 to the security cloud 2406. For example, the gateway 2405 may be included in the control device 2100. As another example, the gateway 2405 may be configured as a separate device in the vehicle 2400 which is distinguished from the control device 2100. The gateway 2405 communicably connects a software management cloud 2409 and a security cloud 2406 which have different networks, and a network in the vehicle 2400 secured by an in-car security software 2410.

For example, the component 2401 may be a sensor. For example, the sensor may be used to acquire information about at least one of a state of the vehicle 2400 or a state of the surroundings of the vehicle 2400. For example, the component 2401 may include a sensor 2110.

For example, the component 2402 may be an electronic control unit (ECU). For example, the ECUs may be used for engine control, transmission control, airbag control, and tire pressure management.

For example, the component 2403 may be an instrument cluster. For example, the instrument cluster may refer to a panel located in front of the driver's seat in the dashboard. For example, the instrument cluster may be configured to show information required to drive to the driver (or passengers). For example, the instrument cluster may be used to display at least one of visual elements indicating revolutions per minute (or rotate per minute, RPM) of an engine, visual elements indicating a speed of the vehicle, visual elements indicating a remaining fuel amount, visual elements indicating a state of a gear, or visual elements indicating information acquired by the component 2401.

For example, the component 2404 may be a telematics device. For example, the telematics device may refer to a device which provides various mobile communication services, such as location information or safety driving, in the vehicle 2400 by combining a wireless communication technique and a global positioning system (GPS) technique. For example, the telematics device may be used to connect a driver, a cloud (for example, a security cloud 2406), and/or surrounding environments and the vehicle 2400. For example, the telematics device may be configured to support the high bandwidth and the low latency for the 5G NR standard technology (for example, a 5G NR V2X technology). For example, the telematics device may be configured to support the autonomous driving of the vehicle 2400.

For example, the gateway 2405 may be used to connect a network in the vehicle 2400 and the software management cloud 2409 and the security cloud 2406 which are networks at the outside of the vehicle. For example, the software management cloud 2409 may be used to update or manage at least one software required to drive and manage the vehicle 2400. For example, the software management cloud 2409 may interwork with the in-car security software 2410 installed in the vehicle. For example, the in-car security software 2410 may be used to provide a security function in the vehicle 2400. For example, the in-car security software 2410 may encrypt data transmitted/received through the in-car network using an encryption key acquired from an external authorized server to encrypt the network in the vehicle. According to various exemplary embodiments, the encryption key used by the in-car security software 2410 may be generated so as to correspond to identification information of the vehicle (a vehicle plate, a VIN number (vehicle identification number) or information assigned uniquely to every user (for example, user identification information).

According to various exemplary embodiments, the gateway 2405 may transmit data encrypted by the in-car security software 2410 based on the encryption key to the software management cloud 2409 and/or the security cloud 2406. The software management cloud 2409 and/or the security cloud 2406 may decrypt the data encrypted by the encryption key of the in-car security software 2410 using the decryption key to identify which vehicle or which user transmits the data. For example, the decryption key is an unique key corresponding to the encryption key so that the software management cloud 2409 and/or the security cloud 2406 identifies a transmission subject (for example, the vehicle or the user) of the data based on the data decrypted by the decryption key.

For example, the gateway 2405 is configured to support the in-car security software 2410 and is associated with the control device 2100. For example, the gateway 2405 may be associated with the control device 2100 to support the connection between a client device 2407 connected to the security cloud 2406 and the control device 2100. As another example, the gateway 2405 may be associated with the control device 2100 to support the connection between a third party cloud 2408 connected to the security cloud 2408 and the control device 2100, but it is not limited thereto.

According to various exemplary embodiments, the gateway 2405 may be used to connect the software management cloud 2409 for managing an operating software of the vehicle 2400 and the vehicle 2400. For example, the software management cloud 2409 monitors whether it is required to update the operating software of the vehicle 2400 and provides data for updating the operating software of the vehicle 2400 by means of the gateway 2405 by monitoring whether it is required to update the operating software o the vehicle 2400. As another example, the software management cloud 2409 receives a user's request to update the operating software of the vehicle 2400 from the vehicle through the gateway 2405 and provides data for updating the operating software of the vehicle 2400 based on the reception, but it is not limited thereto.

FIG. 25 is a view for explaining an operation of an electronic device which trains a neural network based on a set of learning data, according to an exemplary embodiment.

Referring to FIG. 25, in an operation 2502, an electronic device according to the exemplary embodiment may acquire a set of learning data. The electronic device may acquire a set of learning data for supervised learning. The learning data include a pair of input data and ground truth data corresponding to the input data. The ground truth data represents output data to be acquired from the neural network which receives the input data which is a pair of the ground truth data.

For example, when the neural network is trained to recognize an image, the learning data may include an image and information about one or more subjects included in the image. The information may include a category or a class of a subject which is identifiable through an image. The information may include a position, a width, a height and/or size of a visual object corresponding to the subject in the image. The set of learning data identified in the operation 2502 includes pairs of a plurality of learning data. In the example of training the neural network to recognize the image, the set of learning data identified by the electronic device may include a plurality of images and ground truth data corresponding to each of the plurality of images.

Referring to FIG. 25, in an operation 2504, an electronic device according to the exemplary embodiment may train the neural network based on the set of learning data. In an exemplary embodiment in which the neural network is trained based on the supervised learning, the electronic device inputs input data included in the learning data to an input layer of the neural network. An example of the neural network including the input layer will be described with reference to FIG. 26. The electronic device may acquire output data of the neural network corresponding to the input data, from an output layer of the neural network which receives the input data through the input layer.

In one exemplary embodiment, the training of the operation 2504 is performed based on the difference between the output data and the ground truth data which is included in the learning data and corresponds to the input data. For example, the electronic device may adjust one or more parameters (for example, a weight to be described below with reference to FIG. 26) related to the neural network to reduce the difference, based on a gradient descent algorithm. An operation of the electronic device which adjusts the one or more parameters may be referred to as tuning for the neural network. The electronic device may perform the tuning of the neural network based on the output data, using a function defined to evaluate the performance of the neural network, such as a cost function. The difference between the output data and the ground truth data is included as an example of the cost function.

Referring to FIG. 25, in an operation 2506, the electronic device according to the exemplary embodiment may identify whether effective output data is output from the neural network which is trained by the operation 2504. When the output data is effective, it means that the difference between the output data and the ground truth data (or a cost function) satisfies a condition set to use the neural network. For example, when an average value and/or the maximum value of the difference between the output data and the ground truth data is equal to or lower than a predetermined threshold value, the electronic device determines that the effective output data is output from the neural network.

When the effective output data is not output from the neural network (No in 2506), the electronic device may repeatedly perform the training of the neural network based on the operation 2504. However, the exemplary embodiment is not limited thereto and the electronic device repeatedly performs the operations 2502 and 2504.

In a state (Yes in 2506) in which the effective output data is acquired from the neural network, the electronic device according to the exemplary embodiment may use the trained neural network based on the operation 2508. For example, the electronic device inputs another input data which is different from the input data which is input to the neural network as learning data, to the neural network. The electronic device uses the output data which is acquired from the neural network which receives another input data, as a result of inferring another input data based on the neural network.

FIG. 26 is a block diagram of an electronic device 2601 according to an example embodiment. For example, the operation described with reference to FIG. 25 may be performed by an electronic device 2601 of FIG. 26 and/or a processor 2610 of FIG. 26. Further, the operation described with reference to FIGS. 1 to 20 may be performed by the electronic device 2601 of FIG. 26 and/or the processor 2610 of FIG. 26.

Referring to FIG. 26, the processor 2610 of the electronic device 2601 performs computations related to the neural network 2630 stored in a memory 2620. The processor 2610 may include at least one of a CPU (center processing unit), a GPU (graphic processing unit), or a NPU (neural processing unit). The NPU may be implemented as a chip separated from the CPU or integrated in the same chip as the CPU, in the form of a system on chip (SoC). The NPU integrated in the CPU is referred to as a neural core and/or an artificial intelligence (AI) accelerator.

Referring to FIG. 26, the processor 2610 identifies a neural network 2630 stored in the memory 2620. The neural network 2630 includes a combination of an input layer 2632, one or more hidden layers 2634 (or intermediate layers), and output layers 2636. The above-described layers (for example, the input layer 2632, one or more hidden layers 2634, and output layers 2636) include a plurality of nodes. The number of hidden layers 2634 may vary depending on the exemplary embodiment and the neural network 2630 including a plurality of hidden layers 2634 is referred to as a deep neural network. An operation of training the deep neural network is referred to as deep learning.

In one exemplary embodiment, when the neural network 2630 has a structure of a feed forward neural network, a first node included in a specific layer is connected to all second nodes included in the other layers before the specific layer. In the memory 2620, parameters stored for the neural network 2630 include weights assigned to the connections between the second nodes and the first node. In the neural network 1330 having the structure of the feed forward neural network, a value of the first node may correspond to a weighted sum of values allocated to the second nodes, based on weights allocated to the connections of the second nodes and the first node.

In one exemplary embodiment, when the neural network 2630 has a structure of a convolution neural network, the first node included in the specific layer may correspond to a weighted sum for some of the second nodes included in the other layer before the specific layer. Some of the second nodes corresponding to the first node is identified by a filter corresponding to the specific layer. In the memory 2620, parameters stored for the neural network 2630 include weights indicating the filter. The filter includes one or more nodes of the second nodes to be used to calculate the weighted sum of the first node and weights corresponding to the one or more nodes.

According to the exemplary embodiment, the processor 2610 of the electronic device 2601 trains the neural network 2630 using the learning dataset 2640 stored in the memory 2620. The processor 2610 performs the operations described with reference to FIG. 25 based on the learning dataset 2640 to adjust one or more parameters stored in the memory 2620 for the neural network 2630.

According to the exemplary embodiment, the processor 2610 of the electronic device 2601 performs object detection, object recognition and/or object classification, using the neural network 2630 trained based on the learning dataset 2640. The processor 2610 inputs an image (or a video) acquired through the camera 2650 to the input layer 2632 of the neural network 2630. The processor 2610 sequentially acquires values of the nodes of the layers included in the neural network 2630 to acquire a set (for example, output data) of values of the nodes of the output layers 2636, based on the input layer 2632 to which the image is input. The output data may be used as a result of inferring information included in the image using the neural network 2630. However, the exemplary embodiment is not limited thereto and the processor 2610 inputs the image (or the video) acquired from the external electronic device connected to the electronic device 2601 through a communication circuit 2660, to the neural network 2630.

In an exemplary embodiment, the neural network 2630 which is trained to process the image may be used to identify (detect an object) an area corresponding to a subject in the image and/or identify (recognize an object and/or classify an object) a class of the subject expressed in the image. For example, the electronic device 2601 segments the area corresponding to the subject, in the image, using the neural network 2630, based on a quadrangular shape, such as a bounding box. For example, the electronic device 2601 identifies at least one class matching the subject, among a plurality of specified classes, using the network 2630.

In the meantime, in the specification and claims, terms such as "first", "second, "third", and "fourth", if any, are used to distinguish between like components, and if not necessarily, used to describe a specific sequence or an occurrence order. It will be understood that the terms so used are interchangeable under appropriate circumstances such that the exemplary embodiments of the present disclosure described herein may be operated in sequences other than those illustrated or described herein, for example. Likewise, when the method is described herein as comprising a series of steps, the order of those steps presented herein is not necessarily the order in which those steps may be performed, but any described step may be omitted and/or any other step not described herein may be added to the method. For example, without departing from the scope of the present invention, the first component may be referred to as the second component, and similarly, the second component may also be referred to as the first component.

In addition, terms such as "left", "right", "front", "rear", "top", "bottom", "above", "below" in the specification and claims are used for explanation, but are not necessarily intended to describe an invariant relative position. It will be understood that the terms so used are interchangeable under appropriate circumstances such that the exemplary embodiments of the present disclosure described herein may be operated in directions other than those illustrated or described herein, for example. As used herein, the term "connected" is defined as being electrically or non-electrically and directly or indirectly connected. Objects described herein as "adjacent" to each other may be in physical contact with each other, in close proximity to each other, or in the same general scope or area as appropriate for the context in which the phrase is used. The presence of the phrase "in one exemplary embodiment" herein refers to the same exemplary embodiment, although not necessarily.

Further, in the specification and claims, as 'connected', 'connect', 'fastened', 'fasten', 'coupled', 'couple', etc., and various variations of these expressions refer to direct connection with the other components or indirect connection through other components.

In contrast, when it is described that an element is "directly coupled" or "directly connected" to another element, it should be understood that no element is not present therebetween.

Further, a "module" and a "unit" suffixes for components used in the present invention are given or mixed and used by considering easiness in preparing a specification and do not have a meaning or role distinguished from each other in themselves.

The terms used in the present specification are for explaining the embodiments rather than limiting the present invention. A singular form used in the present invention may include a plural form unless it has a clearly opposite meaning in the context. Terminologies such as "be configured by" or "include" in the present invention should not be interpreted to necessarily include all of plural components or plural steps described in the present invention, but should be interpreted not to include some of the components or steps or to further include additional components or steps.

For now, the present disclosure has been described with reference to the exemplary embodiments. All exemplary embodiments and conditional examples disclosed in the specification are illustratively described in order to help those skilled in the art to understand a principle and a concept of the present invention. Therefore, those skilled in the art may understand that the present invention may be modified without departing from an essential feature of the present invention.

Therefore, the disclosed exemplary embodiments may be considered by way of illustration rather than limitation. The scope of the present disclosure is presented not in the above description but in the claims and it may be interpreted that all differences within an equivalent range thereto may be included in the present disclosure.

The above described method according to various exemplary embodiments of the present disclosure may be implemented as a program to be provided to servers or devices. Accordingly, the devices access a server or a device in which the program is stored to download the program.

Further, the above-described method according to various exemplary embodiments of the present disclosure is implemented as a program to be stored and provided in various non-transitory computer readable media. The non-transitory computer readable medium refers to a medium that stores data semi-permanently and is readable by the device, rather than a medium that stores data for a short moment, such as registers, caches, and memories. Specifically, various applications or programs described above may be stored and provided in the non-transitory computer readable media, such as CDs, DVDs, hard disks, Blu-ray disks, USBs, memory cards, or ROMs.

In addition, preferred embodiments of the present invention have been illustrated and described above, but the present invention is not limited to the above-described specific embodiment, it is obvious d that various modification may be made by those skilled in the art, to which the present invention pertains without departing from the gist of the present invention, which is claimed in the claims, and such modified embodiments should not be individually understood from the technical spirit or prospect of the present invention.

What is claimed is:

1. A method for measuring a distance between vehicles, comprising:

acquiring a 2D image obtained by capturing a non-ego vehicle using a camera mounted in an ego vehicle in driving;

detecting a 2D bounding box which encloses the non-ego vehicle in the 2D image;

detecting a 3D coordinate of at least one 3D vertex of a virtual 3D bounding box which encloses the non-ego vehicle in a 3D space, from a coordinate of a vertex of the 2D bounding box, using unprojection conversion from the 2D image to the 3D space, based on an intrinsic parameter of the camera and an extrinsic parameter with respect to the ego vehicle; and measuring a distance between the ego vehicle and the non-ego vehicle using the 3D coordinate of the at least one 3D vertex, wherein the extrinsic parameter is determined with respect to a 3D space coordinate system in which a first axis, a second axis, and a third axis are set according to a length direction, a width direction, and a height direction of the ego vehicle, wherein the detecting of a 3D coordinate includes:

acquiring a first 3D coordinate and a second 3D coordinate from a first vertex and a second vertex on a lower edge of the 2D bounding box, by means of the unprojection conversion;

acquiring a 3D intersection point of a first straight line which passes through the first 3D coordinate and is parallel to the first axis and a second straight line which passes through the second 3D coordinate and is parallel to the second axis, from the 3D space; and acquiring a 3D coordinate of a first 3D vertex using the 3D intersection point and a fourth vertex above the second vertex in the 2D bounding box.

2. The method for measuring a distance between vehicles according to claim 1, wherein the acquiring of a 3D coordinate of a first 3D vertex includes:

acquiring a 2D coordinate from the 3D intersection point, by means of projection conversion from the 3D space to the 2D image;

acquiring a 2D intersection point of a segment which connects the 2D coordinate and the fourth vertex and a segment which connects the first vertex and the second vertex, in the 2D image; and acquiring a 3D coordinate of the first 3D vertex, by means of the unprojection conversion, from the 2D intersection point.

3. The method for measuring a distance between vehicles according to claim 1, further comprising:

acquiring a third straight line which passes through the first 3D vertex and is parallel to the first axis and a fourth straight line which passes through the first 3D vertex and is parallel to the second axis, in the 3D space;

acquiring a third straight and a fourth straight line in the 2D image, by means of the projection conversion from the 3D space into the 2D image, from the third straight line and the fourth straight line;

acquiring a 3D coordinate of a second 3D vertex using a third straight line in the 2D image, the first vertex, and a third vertex above the first vertex in the 2D bounding box; and acquiring a 3D coordinate of a third 3D vertex using a fourth straight line in the 2D image, the second vertex, and a fourth vertex above the second vertex in the 2D bounding box.

4. The method for measuring a distance between vehicles according to claim 3, wherein in the acquiring of a 3D coordinate of the second 3D vertex, a 2D intersection point of a third straight line in the 2D image and a segment which connects the first vertex and the third vertex is acquired and a 3D coordinate of the second 3D vertex is acquired from the 2D intersection point, by means of the unprojection conversion.

5. The method for measuring a distance between vehicles according to claim 3, wherein in the acquiring of a 3D coordinate of the third 3D vertex, a 2D intersection point of a fourth straight line in the 2D image and a segment which connects the second vertex and the fourth vertex is acquired and a 3D coordinate of the third 3D vertex is acquired from the 2D intersection point, by means of the unprojection conversion.

6. The method for measuring a distance between vehicles according to claim 3, further comprising:
acquiring a height of the non-ego vehicle in the 3D space; and
acquiring a 3D coordinate of each of a fifth 3D vertex, a sixth 3D vertex, and a seventh 3D vertex, from a 3D coordinate of each of the first 3D vertex, the second 3D vertex, and the third 3D vertex and the height of the non-ego vehicle.

7. The method for measuring a distance between vehicles according to claim 6, wherein the acquiring of a height of the non-ego vehicle in the 3D space includes:
acquiring a 2D coordinate from the third 3D vertex, by means of the unprojection conversion, drawing a circle which is centered on the 2D coordinate and passes through the fourth vertex in the 2D image, and acquiring a 2D intersection point of the circle and the fourth straight line in the 2D image;
acquiring a 3D coordinate and a 3D intersection point from the 2D coordinate and the 2D intersection point, by means of the unprojection conversion; and
acquiring the height of the non-ego vehicle with a distance between the 3D coordinate and the 3D intersection point in the 3D space.

8. An apparatus for measuring a distance between vehicles, comprising:
an image acquiring unit which acquires a 2D image obtained by capturing a non-ego vehicle using a camera mounted in an ego vehicle in driving;
a bounding box detecting unit which detects a 2D bounding box which encloses the non-ego vehicle in the 2D image;
a 3D information reconstructing unit which detects a 3D coordinate of at least one 3D vertex of a virtual 3D bounding box which encloses the non-ego vehicle in a 3D space, from a coordinate of a vertex of the 2D bounding box, using unprojection conversion from the 2D image to the 3D space, based on an intrinsic parameter of the camera and an extrinsic parameter with respect to the ego vehicle; and
a distance measuring unit which measures a distance between the ego vehicle and the non-ego vehicle using the 3D coordinate of the at least one 3D vertex,
wherein the extrinsic parameter is determined with respect to a 3D space coordinate system in which a first axis, a second axis, and a third axis are set according to a length direction, a width direction, and a height direction of the ego vehicle,
wherein the 3D information reconstructing unit acquires a first 3D coordinate and a second 3D coordinate from a first vertex and a second vertex on the lower edge of the 2D bounding box, by means of the unprojection conversion, acquires a 3D intersection point of a first straight line which passes through the first 3D coordinate and is parallel to the first axis and a second straight line which passes through the second 3D coordinate and is parallel to the second axis, in the 3D space, and acquires a 3D coordinate of a first 3D vertex using a fourth vertex above the second vertex, from the 3D intersection point and the 2D bounding box.

9. The apparatus for measuring a distance between vehicles according to claim 8, wherein the 3D information reconstructing unit acquires a 2D coordinate from the 3D intersection point, by means of projection conversion from the 3D space to the 2D image, acquires a 2D intersection point of a segment which connects the 2D coordinate and the fourth vertex and a segment which connects the first vertex and the second vertex, in the 2D image, and acquires a 3D coordinate of the first 3D vertex, by means of the unprojection conversion, from the 2D intersection point.

10. The apparatus for measuring a distance between vehicles according to claim 8, wherein the 3D information reconstructing unit acquires a third straight line which passes through the first 3D vertex and is parallel to the first axis and a fourth straight line which passes through the first 3D vertex and is parallel to the second axis, from the 3D space, acquires a third straight and a fourth straight line in the 2D image, by means of the projection conversion from the 3D space into the 2D image, from the third straight line and the fourth straight line, acquires a 3D coordinate of a second 3D vertex using a third straight line in the 2D image, the first vertex, and a third vertex above the first vertex in the 2D bounding box, and acquires a 3D coordinate of a third 3D vertex using a fourth straight line in the 2D image, the second vertex, and a fourth vertex above the second vertex in the 2D bounding box.

11. The apparatus for measuring a distance between vehicles according to claim 10, wherein the 3D information reconstructing unit acquires a height of the non-ego vehicle in the 3D space, and acquires a 3D coordinate of each of a fifth 3D vertex, a sixth 3D vertex, and a seventh 3D vertex, from a 3D coordinate of each of the first 3D vertex, the second 3D vertex, and the third 3D vertex and the height of the non-ego vehicle.

12. A method for reconstructing 3D information from a 2D image, comprising:
acquiring a 2D image obtained by capturing a non-ego vehicle using a camera mounted in an ego vehicle in driving;
detecting a 2D bounding box which encloses the non-ego vehicle in the 2D image; and
detecting a 3D coordinate of at least one 3D vertex of a virtual 3D bounding box which encloses the non-ego vehicle in a 3D space, from a coordinate of a vertex of the 2D bounding box, using unprojection conversion from the 2D image to the 3D space, based on an intrinsic parameter of the camera and an extrinsic parameter with respect to the ego vehicle,
wherein the extrinsic parameter is determined with respect to a 3D space coordinate system in which a first axis, a second axis, and a third axis are set according to a length direction, a width direction, and a height direction of the ego vehicle,
wherein the detecting of a 3D coordinate includes:
acquiring a first 3D coordinate and a second 3D coordinate from a first vertex and a second vertex on the lower edge of the 2D bounding box, by means of the unprojection conversion;
acquiring a 3D intersection point of a first straight line which passes through the first 3D coordinate and is parallel to the first axis and a second straight line which passes through the second 3D coordinate and is parallel to the second axis, in the 3D space; and
acquiring a 3D coordinate of a first 3D vertex using a fourth vertex above the second vertex, from the 3D intersection point and the 2D bounding box.

13. The method for reconstructing 3D information according to claim 12, further comprising:
acquiring a third straight line which passes through the first 3D vertex and is parallel to the first axis and a fourth straight line which passes through the first 3D vertex and is parallel to the second axis, from the 3D space;

acquiring a third straight and a fourth straight line in the 2D image, by means of the projection conversion from the 3D space into the 2D image, from the third straight line and the fourth straight line;

acquiring a 3D coordinate of a second 3D vertex using a third straight line in the 2D image, the first vertex, and a third vertex above the first vertex in the 2D bounding box; and acquiring a 3D coordinate of a third 3D vertex using a fourth straight line in the 2D image, the second vertex, and a fourth vertex above the second vertex in the 2D bounding box.

14. The method for reconstructing 3D information according to claim 13, further comprising:

acquiring a height of the non-ego vehicle in the 3D space; and acquiring a 3D coordinate of each of a fifth 3D vertex, a sixth 3D vertex, and a seventh 3D vertex, from a 3D coordinate of each of the first 3D vertex, the second 3D vertex, and the third 3D vertex and the height of the non-ego vehicle.

\* \* \* \* \*